US012697914B2

(12) United States Patent
Metz et al.

(10) Patent No.: US 12,697,914 B2
(45) Date of Patent: Aug. 4, 2026

(54) TRAILER AND TRUCK WITH EXPANDABLE CARGO COMPARTMENT FOR MULTIPURPOSE SHELTER

(71) Applicants:Darryl Clive Metz, Miami, FL (US);
Cherise Mandy Metz, Miami, FL (US)

(72) Inventors: Darryl Clive Metz, Miami, FL (US);
Cherise Mandy Metz, Miami, FL (US)

( * ) Notice: Subject to any disclaimer, the term of this patent is extended or adjusted under 35 U.S.C. 154(b) by 206 days.

(21) Appl. No.: 18/794,057

(22) Filed: Aug. 5, 2024

(65) Prior Publication Data

US 2026/0034926 A1    Feb. 5, 2026

(51) Int. Cl.
B60P 3/34 (2006.01)
B60P 3/14 (2006.01)

(52) U.S. Cl.
CPC .. B60P 3/34 (2013.01); B60P 3/14 (2013.01)

(58) Field of Classification Search
CPC .................................... B60P 3/34; B60P 3/14
See application file for complete search history.

(56) References Cited

U.S. PATENT DOCUMENTS

| | | |
|---|---|---|
| 1,564,257 A | 12/1925 | Lippman |
| 2,298,530 A | 10/1942 | Fletcher |
| 2,513,411 A | 7/1950 | Heil |
| 3,489,452 A | 1/1970 | Plante |
| 3,724,893 A | 4/1973 | Giroux |
| 5,761,854 A | 6/1998 | Johnson et al. |

| | | | |
|---|---|---|---|
| 8,562,066 B2 | 10/2013 | Holtkamp | |
| 9,080,326 B2 | 7/2015 | Johnson et al. | |
| 9,085,890 B2 | 7/2015 | Strickland et al. | |
| 9,333,820 B2 | 5/2016 | Anabtawi et al. | |
| 9,347,560 B2 | 5/2016 | Lindner et al. | |
| 9,970,207 B2 * | 5/2018 | Wasson .................. | E04H 15/20 |
| 10,392,828 B2 | 8/2019 | Johnson et al. | |
| 10,794,080 B2 | 10/2020 | Johnson et al. | |
| 11,247,601 B1 | 2/2022 | Metz et al. | |
| 11,377,868 B2 | 7/2022 | Johnson et al. | |
| 11,384,529 B2 | 7/2022 | Johnson et al. | |
| 11,746,555 B2 | 9/2023 | Johnson et al. | |
| D1,040,698 S * | 9/2024 | Kamdron .................... | D12/103 |
| 2003/0146646 A1 | 8/2003 | Cervenka | |
| 2006/0226677 A1 | 10/2006 | Smith | |
| 2011/0297675 A1 | 12/2011 | Johnson et al. | |

(Continued)

FOREIGN PATENT DOCUMENTS

| | | |
|---|---|---|
| CN | 105438053 | 3/2016 |
| CN | 110329136 | 10/2019 |

(Continued)

OTHER PUBLICATIONS

- International Search Report and Written Opinion—Metz et al.—Date of Completion Aug. 27, 2025.

(Continued)

*Primary Examiner* — Taras P Bemko
(74) *Attorney, Agent, or Firm* — Dennis D. Brown; Brown Patent Law, P.L.L.C.

(57)    ABSTRACT

Trailers and trucks, for hauling cargo, which also have expandable tent compartment assemblies for use as modern, rapidly deployable sleeping quarters, offices, administrative facilities, medical facilities, command centers, kitchens, canteens, etc.

19 Claims, 23 Drawing Sheets

(56) References Cited

U.S. PATENT DOCUMENTS

| | | | |
|---|---|---|---|
| 2014/0311051 A1* | 10/2014 | Fagan | E04B 1/34384 |
| | | | 52/79.5 |
| 2015/0246699 A1 | 9/2015 | Anabtawi et al. | |
| 2016/0160522 A1 | 6/2016 | Schwebach | |
| 2018/0361906 A1 | 12/2018 | Devine | |
| 2019/0352923 A1 | 11/2019 | Harrison et al. | |
| 2021/0180314 A1* | 6/2021 | Banerjee | E04B 1/3444 |

FOREIGN PATENT DOCUMENTS

| | | |
|---|---|---|
| DE | 000003009614 | 9/1981 |
| DE | 8323494 | 7/1986 |
| DE | 202009007104 | 11/2010 |
| EP | 0787078 | 5/2000 |
| EP | 1162323 | 12/2001 |
| FR | 1503854 | 12/1967 |
| FR | 2327741 | 5/1977 |
| FR | 2532597 | 9/1984 |
| GB | 772954 | 4/1957 |
| GB | 1194840 | 10/1970 |
| GB | 1596101 | 8/1981 |
| GB | 1603402 | 11/1981 |
| GB | 2084943 | 4/1982 |
| GB | 2500946 | 9/2012 |
| JP | 1993155285 | 6/1993 |
| KR | 101353408 | 1/2014 |
| KR | 101532912 | 7/2015 |
| KR | 101541394 | 8/2015 |
| KR | 1020190108365 | 9/2019 |
| WO | 1999065731 | 12/1999 |
| WO | 2007042042 | 4/2007 |
| WO | 2020047275 | 3/2020 |

OTHER PUBLICATIONS

Expandable Container; The Smart, Hybrid Shelter Design; https://www.weatherhaven.com/products/expandable-container/mecc.
Justia Patents Assigned to Weatherhaven Global Resources Ltd. https://patents.justia.com/assignee/weatherhaven-global-resources-ltd.
Weatherhaven Innovation—World Class Engineering Team; https://www.weatherhaven.com/Innovation.
Expandable Container System : Transforming Deployable Shelters for Extreme Conditions; https://westernshelter.com/ecs90.
Nordic Shelter; www.nordicshelter.com.

* cited by examiner

TRAILER AND TRUCK WITH EXPANDABLE CARGO COMPARTMENT FOR MULTIPURPOSE SHELTER

FIELD OF THE INVENTION

The present invention relates to trailers and trucks having cargo compartments which are expandable for use as rapidly deployable sleeping quarters, offices, administrative facilities, medical facilities, command centers, kitchens, or canteens, as well as for other purposes. The cargo compartments can also include bathrooms, climate controls, and other features.

BACKGROUND OF THE INVENTION

In the face of natural disasters and other large scale emergency situations, a need exits for rapidly deployable trailer and truck systems which, in addition to hauling food, water, equipment, and other critical cargo to the disaster or emergency site, can also be used for additional purposes of vital importance. A need particularly exists for trailers and trucks having cargo compartments which can be quickly expanded and converted for use as modern, equipped sleeping, administrative, command, medical, office, canteen, kitchen, and other facilities, and which can also include bathrooms, climate controls, kitchenettes, and other features.

As just one example, the United Nations High Commission for Refugees estimates that there are over 35 million refugees worldwide. The use of traditional tents to humanely house these people has proven to be inadequate for several reasons. Tents lack privacy and fail to provide adequate protection against extreme weather conditions, ground water, mud, sand and dust. Tents also (i) lack durability and are easily damaged, (ii) are not equipped for delivering essential water, electrical, and other services and utilities, and (iii) do not provide sufficient protection, safety, and security against theft and other crimes.

SUMMARY OF THE INVENTION

The present invention provides trailers and trucks which are rapidly deployable and readily customizable for addressing the problems and satisfying the needs mentioned above. The inventive trailer and truck systems provide expandable shelters which are adaptable for all manner of different uses and operations. Unlike traditional tents, the inventive shelters do not have to be transported separately as additional cargo. Moreover, the inventive, expandable shelters are (i) comfortable and accommodating, (ii) spaced above ground to provide protection against water, mud, sand, and dust, (iii) designed for extreme weather conditions, (iv) very cost-effective and affordable, (v) very sturdy and highly durable, (vi) much safer and more secure, and (vi) re-deployable, at a moments notice, for repeated use.

The expandable shelters also provide greater privacy and can provide electrical and utility hookups, supports, etc. as needed for use, e.g., as modern sleeping, administrative, command, medical, office, canteen, kitchen, and other facilities. The expandable shelters can also include bathrooms, climate controls, personal storage lockers, kitchenettes, and other features. Plus, the interiors of the inventive trailers and trucks can be formed of composites or other materials which are light weight and easy to wash down and disinfect so that the inventive expandable shelters are far more sanitary than traditional tents.

In addition, as compared to traditional tents, the inventive trailer and truck shelter systems are much easier and require much less manpower to open, set-up, breakdown, and re-deploy, thus saving significant time and expense.

As another alternative, the inventive trailer and truck systems are also well suited for use as camping or glamping units, and for other recreational purposes.

In one aspect, there is provided a trailer or truck which preferably comprises: (a) a cargo housing having a cargo compartment therein, a cargo bed which extends longitudinally in a bottom of the cargo housing, a roof spaced above the cargo bed, a first substantially vertical side which extends longitudinally between a rearward longitudinal end and a forward longitudinal end of the cargo housing, and a second substantially vertical side, opposite the first substantially vertical side, which extends longitudinally between the rearward longitudinal end and the forward longitudinal end; (b) a side opening, in at least the first substantially vertical side, having a longitudinal length which is at least half of a longitudinal distance measured from the rearward longitudinal end to the forward longitudinal end of the cargo housing; and (c) a tent compartment assembly.

The tent compartment assembly preferably comprises: (1) a side panel having a lower end which is pivotably connected to the cargo housing for pivoting the side panel from a raised (preferably vertical or substantially vertical) position, in which the side panel covers the side opening, to at least a lowered (preferably horizontal or substantially horizontal) position in which the side panel becomes a floor of the tent compartment assembly; (2) a collapsible tent having a bottom end which is attached to the side panel and an inner side which is connected to the cargo housing along at least most of a longitudinal top, at least most of a substantially vertical forward end, and at least most of a substantially vertical rearward end of the side opening of the cargo housing so that the side opening of the cargo housing is an entryway for the tent compartment assembly when the side panel is in the lowered position; (3) a tent wall frame which is pivotably attached to the side panel so that when the side panel is in the lowered position, the tent wall frame can be pivoted upwardly inside the collapsible tent to a raised position in which the tent wall frame raises and supports an outer (preferably substantially vertical) wall of the collapsible tent; and (4) a tent roof frame which is pivotably attached to the tent wall frame so that when the tent wall frame is pivoted upwardly to the raised position of the tent wall frame, the tent roof frame can be pivoted upwardly inside the collapsible tent to a raised position to raise and support a roof of the collapsible tent.

In another aspect, there is provided a trailer or truck which preferably comprises: (a) a cargo housing having a cargo compartment therein for hauling cargo, a cargo bed which extends longitudinally in a bottom the cargo housing, a roof spaced above the cargo bed, a first substantially vertical side which extends longitudinally between a rearward longitudinal end and a forward longitudinal end of the cargo housing, and a second substantially vertical side, opposite the first substantially vertical side, which extends longitudinally between the rearward longitudinal end and the forward longitudinal end; (b) each of the first and second substantially vertical sides having a side opening therein having a longitudinal length which is at least half of a longitudinal distance measured from the rearward longitudinal end to the forward longitudinal end of the cargo housing; and (c) the side opening of each of the first and second substantially vertical sides having a tent compartment assembly associated therewith.

The tent compartment assembly associated with the side opening of each of the first and second substantially vertical sides of the cargo housing preferably comprises: (1) a side panel having a lower end which is pivotably connected to the cargo housing for pivoting the side panel from a raised position, in which the side panel covers the side opening, to at least a lowered position in which the side panel becomes a floor of the tent compartment assembly; (2) a collapsible tent having a bottom end which is attached the side panel and an inner side which is connected to the cargo housing along at least most of a longitudinal top, at least most of a substantially vertical forward end, and at least most of a substantially vertical rearward end of the side opening of the cargo housing so that the side opening of the cargo housing is an entryway for the tent compartment assembly when the side panel is in the lowered position; (3) a tent wall frame which is pivotably attached to the side panel so that when the side panel is in the lowered position, the tent wall frame can be pivoted upwardly inside the collapsible tent to a raised position in which the tent wall frame raises and supports an outer wall of collapsible tent, wherein when the outer wall of the collapsible tent is raised, it is opposite the inner side of the collapsible tent; and (4) a tent roof frame which is pivotably attached to the tent wall frame so that when the tent wall frame is pivoted upwardly to the raised position of the tent wall frame, the tent roof frame can be pivoted upwardly inside the collapsible tent to a raised position to raise and support a roof of the collapsible tent.

Further aspects, features, and advantages of the present invention will be apparent to those in the art upon examining the accompanying drawings and upon reading the following Detailed Description of the Preferred Embodiments.

Figure 1:
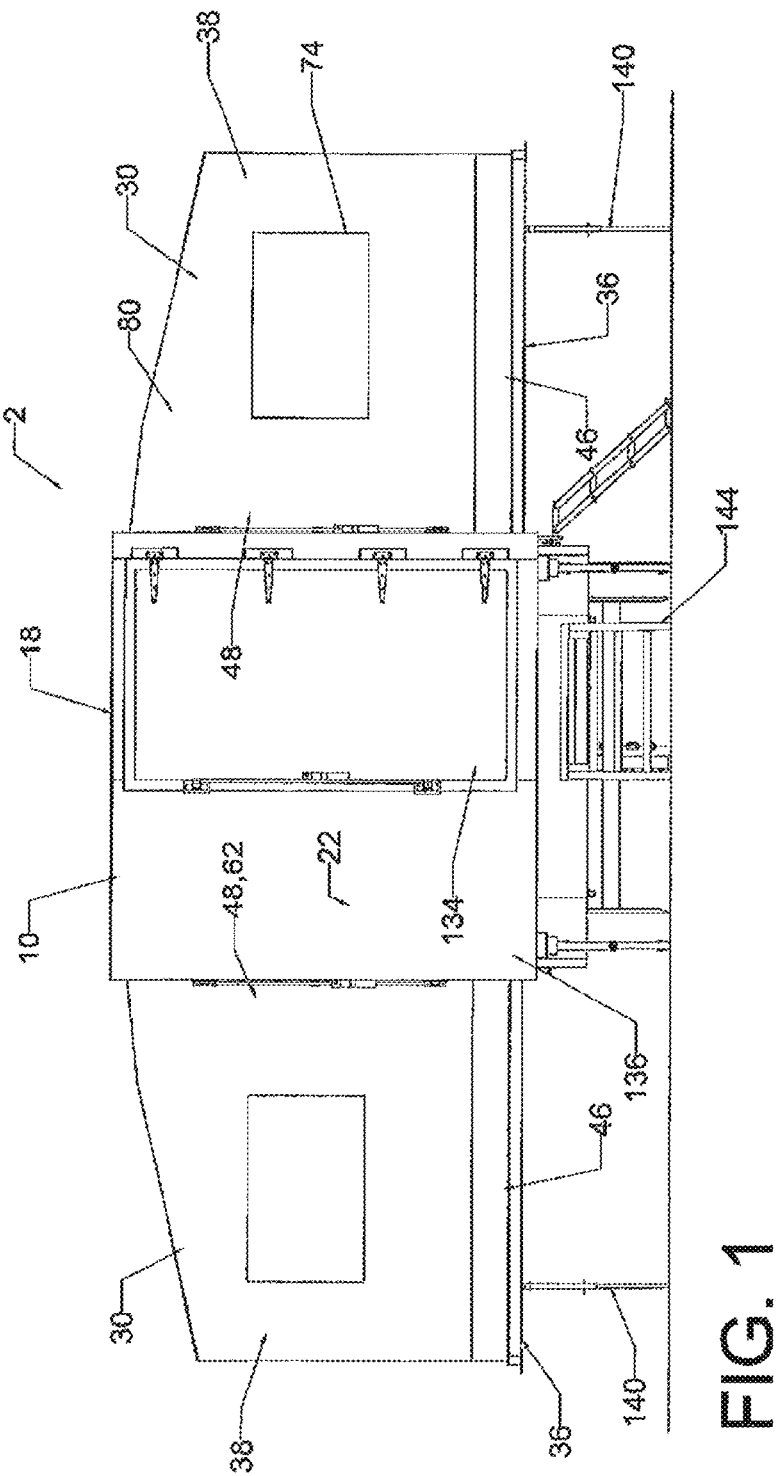
FIG. 1 is an elevational front view of an embodiment 2 of the inventive trailer with the inventive trailer 2 having a flat roof.

DETAILED DESCRIPTION OF THE
PREFERRED EMBODIMENTS

An embodiment 2 of the trailer provided by the present invention is illustrated in FIGS. 1-4, 6-13, and 21. The inventive trailer 2 has dual axles 4 and 6, four wheels 5, and a standard trailer hitch 8 for towing by any type of truck or other vehicle. It will be understood, however, that the trailer 2 can alternatively (i) be a gooseneck-style trailer with a gooseneck trailer hitch, (ii) use any other type of hitch, (iii) be of any desired size and have only one axle or any other number of axles and wheels, and/or (iv) be a semi-trailer pulled by a semi-truck.

Figure 22:
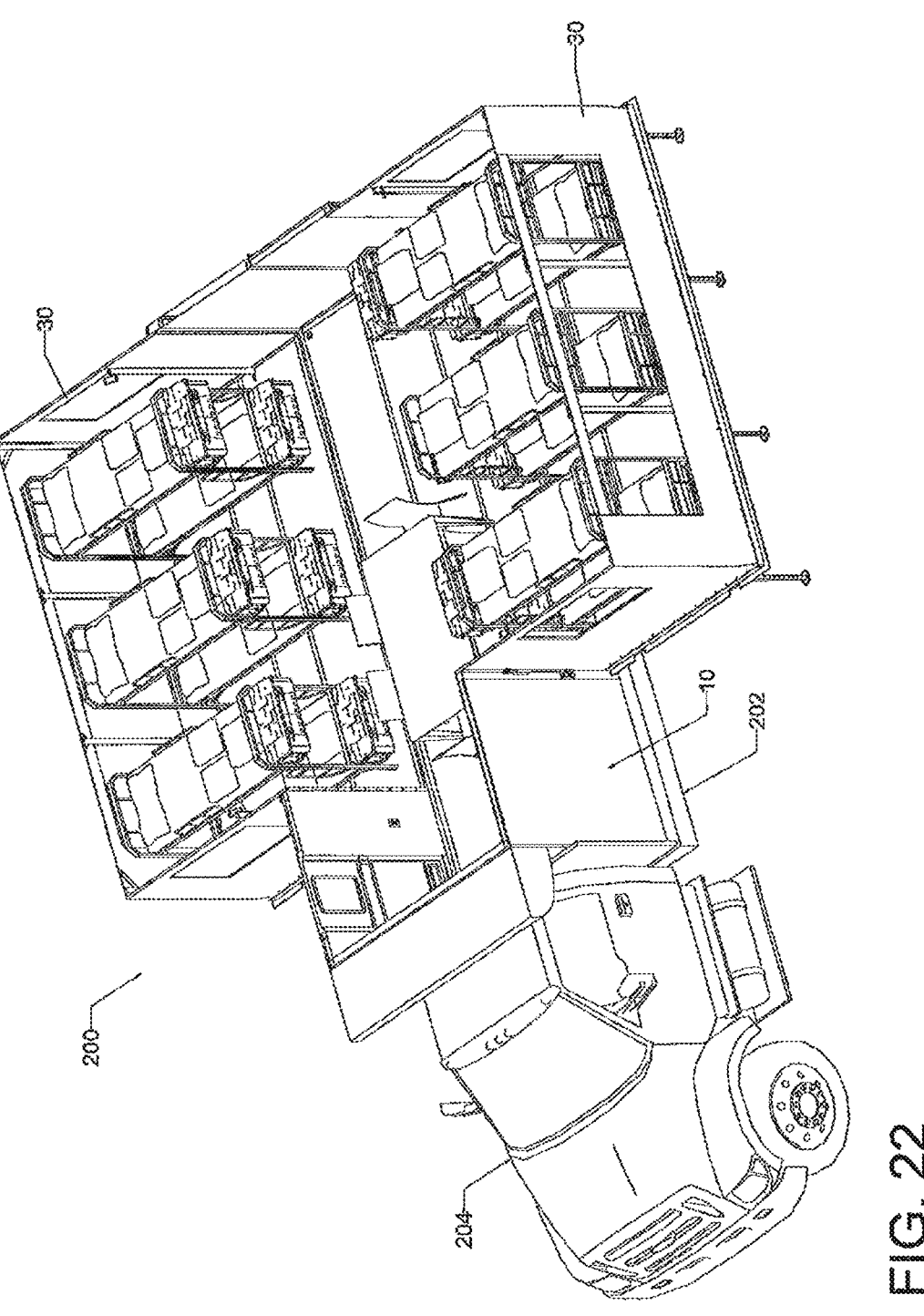
FIG. 22 is a cutaway top perspective view of an embodiment 200 of the truck provided by the present invention, with the tent compartment assemblies 30 thereof deployed.
Figure 23:
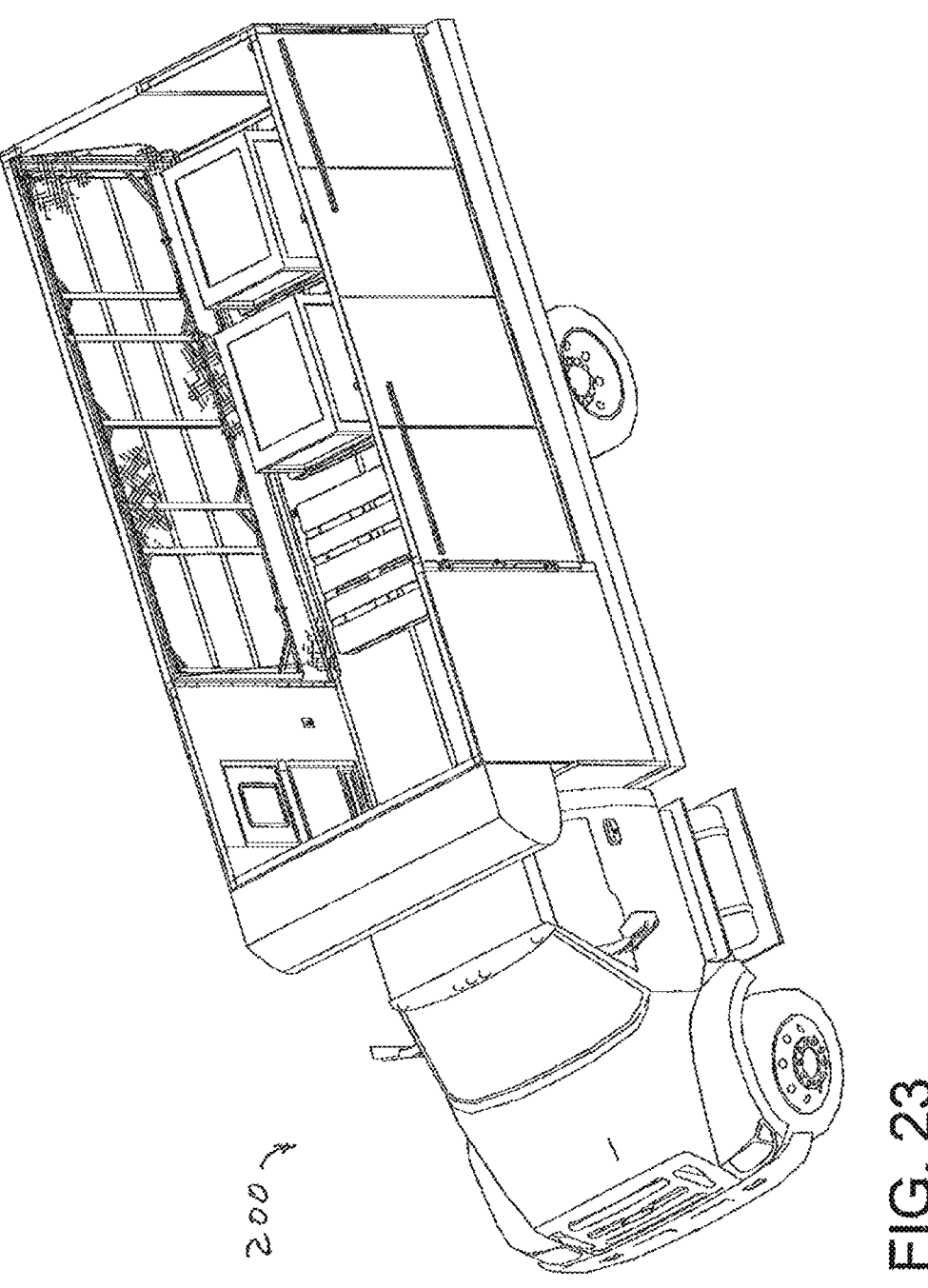
FIG. 23 is a cutaway top perspective view of the inventive truck 200 wherein the tent compartment assemblies thereof are closed and the truck is carrying cargo therein.

An embodiment 200 of the truck provided by the present invention is illustrated in FIGS. 22 and 23. The embodiment 200 of the inventive truck is identical to the embodiment 2 of the inventive trailer except that, whereas the trailer 2 has a trailer hitch 8 for towing, the inventive truck 200 has a fixed bed 202 which extends rearwardly behind the cab 204 of the truck 200. Consequently, unless otherwise expressly indicated, all of the other elements and features discussed herein for the inventive trailer 2 also apply to the inventive truck 200.

The inventive trailer 2 preferably comprises a cargo housing 10 having: a longitudinal axis 12; a cargo compartment 14 in the cargo housing 10; a cargo bed 16 which extends longitudinally in the bottom of the cargo housing 10; a roof 18 spaced above the cargo bed 16; a first substantially vertical side 20 which extends longitudinally between the rearward longitudinal end 22 and the forward longitudinal end 24 of the cargo housing 10; and a second substantially vertical side 26, opposite and preferably parallel to the first substantially vertical side 20, which extends longitudinally between the rearward longitudinal end 22 and the forward longitudinal end 24 of the cargo housing 10.

Figure 2:
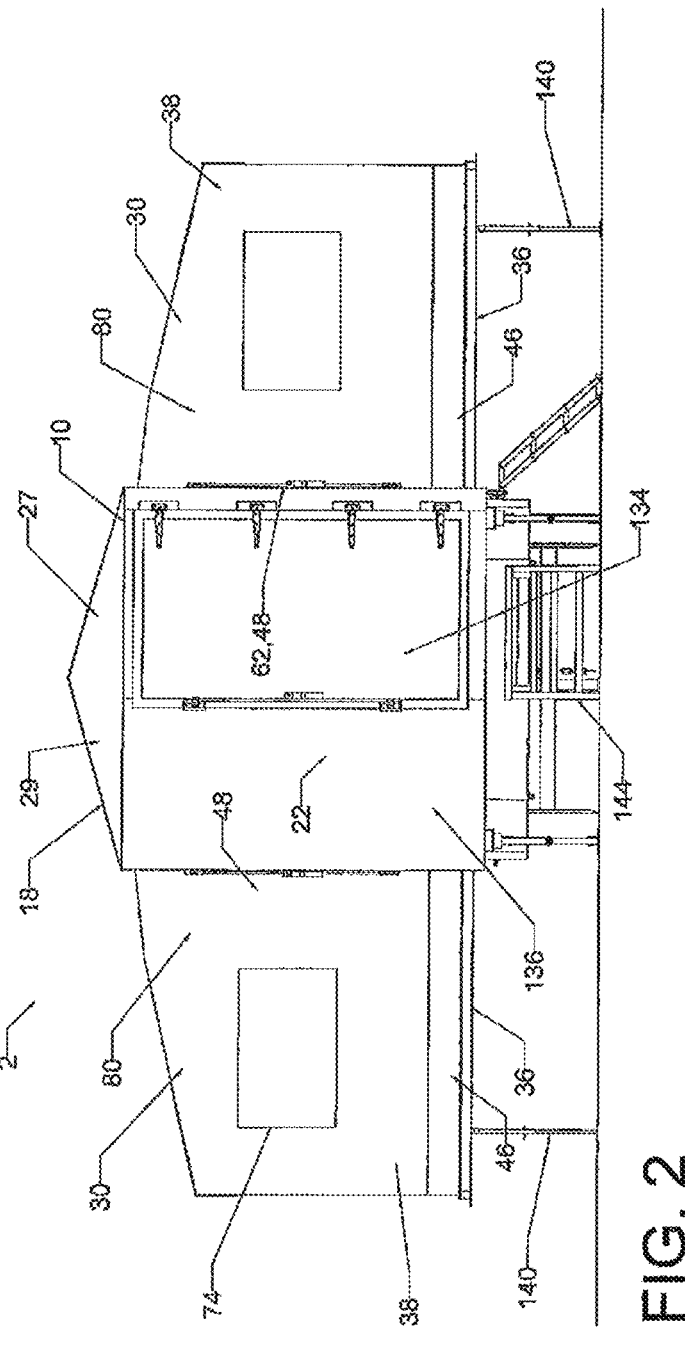
FIG. 2 is an elevational front view of the inventive trailer 2 with the trailer 2 having a gabled roof.
Figure 3:
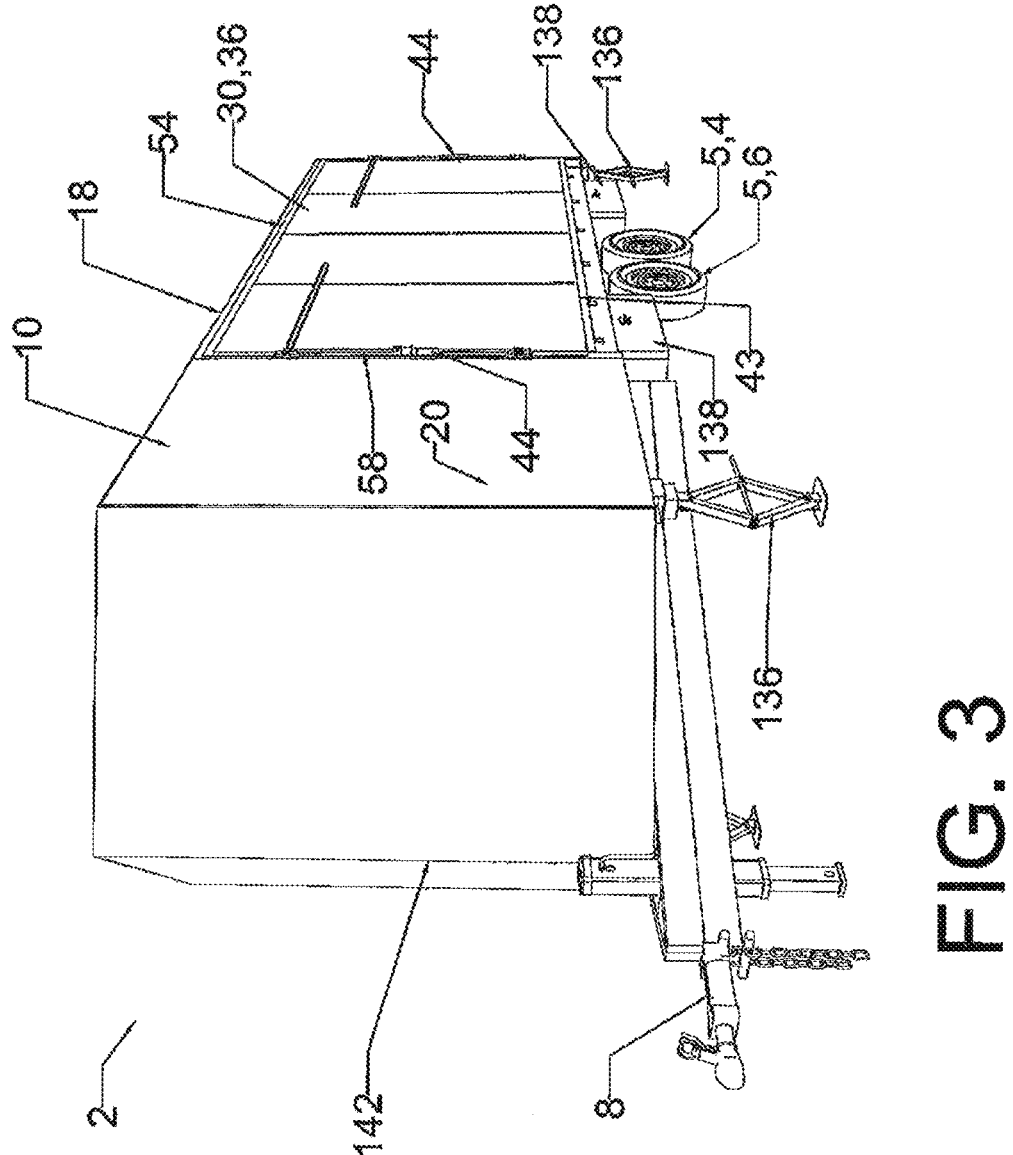
FIG. 3 is a perspective view of the inventive trailer 2.
Figure 4:
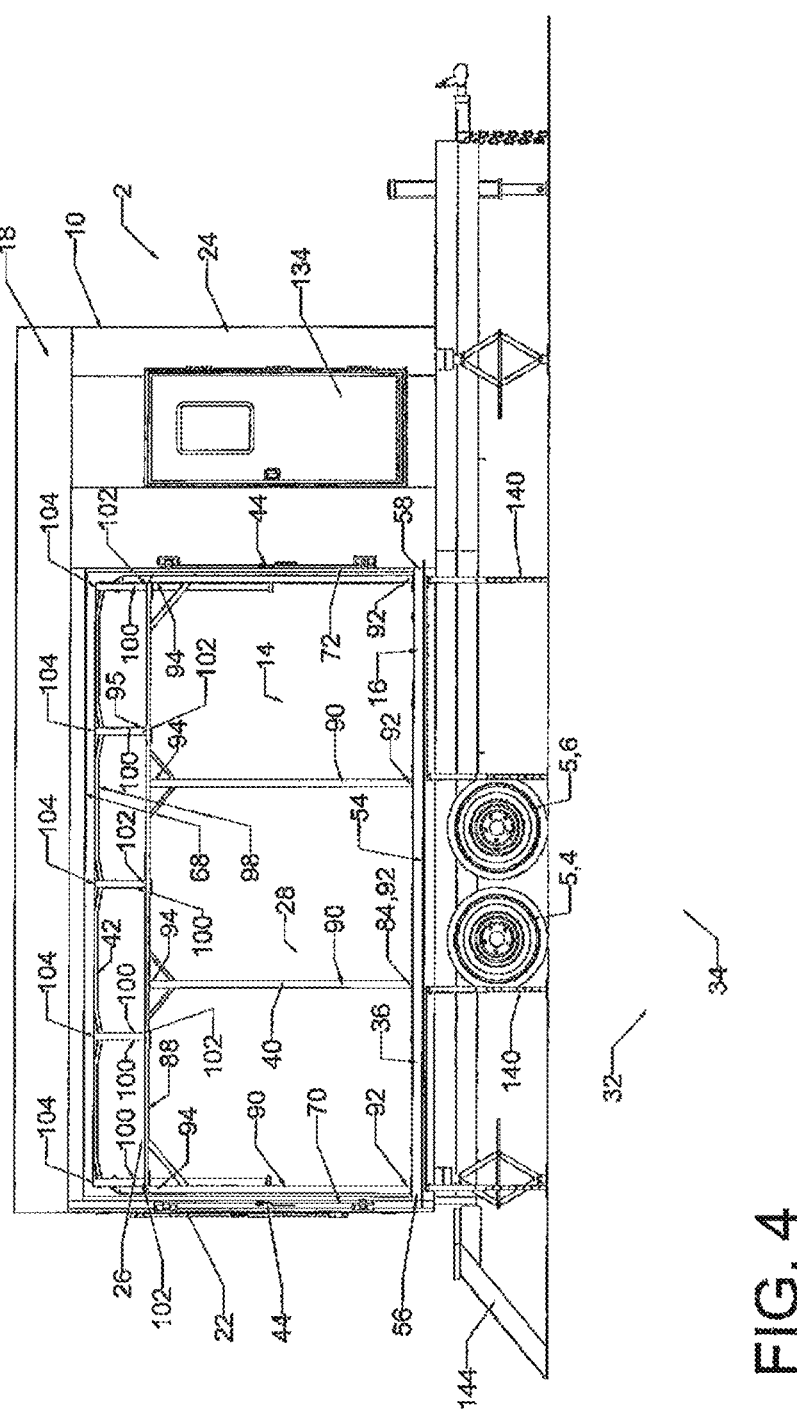
FIG. 4 is an elevational side view of the inventive trailer 2.
Figure 5:
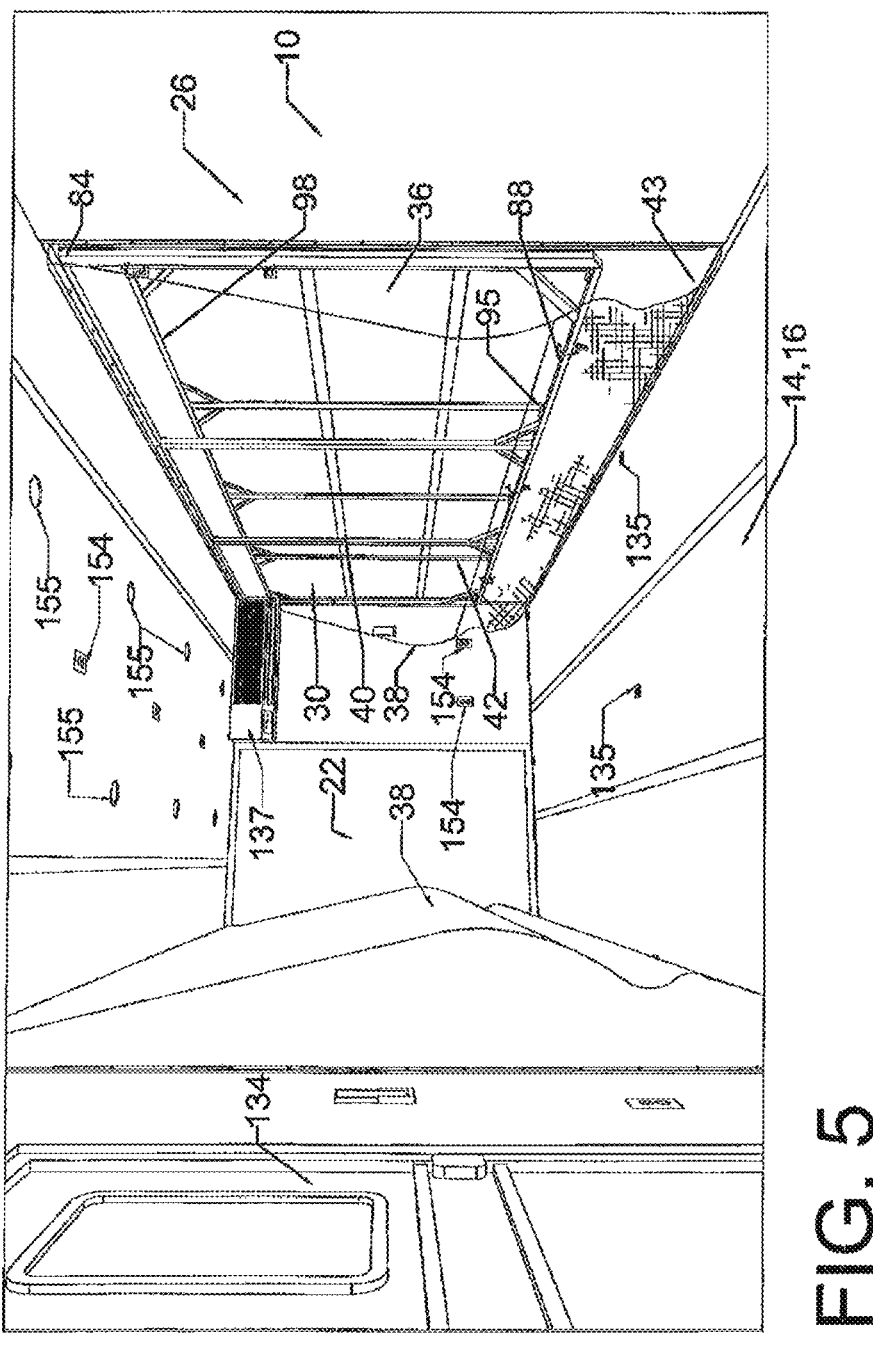
FIG. 5 is a perspective interior view of the inventive trailer 2.
Figure 6:
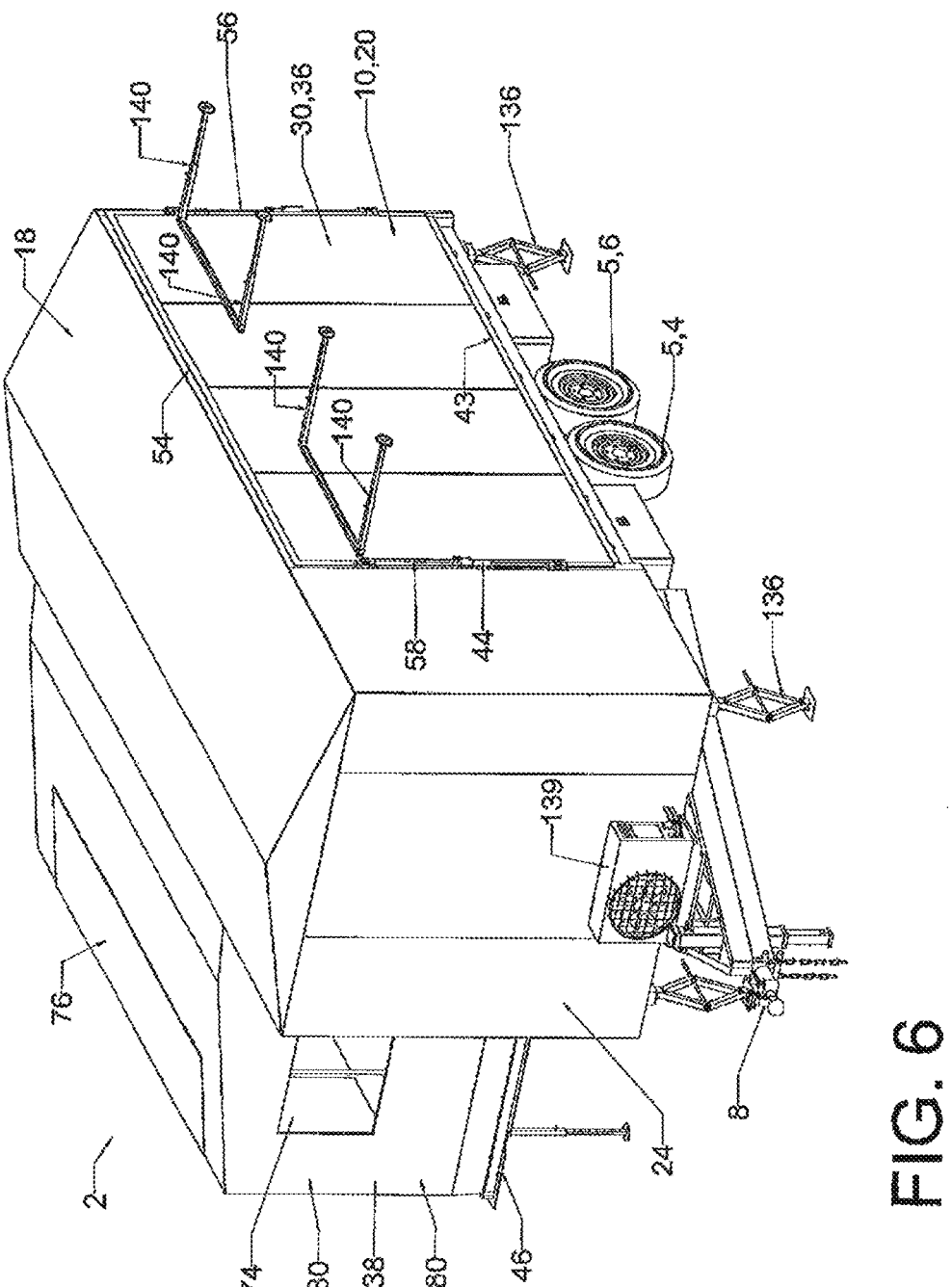
FIG. 6 is another perspective view of the inventive trailer 2.
Figure 7:
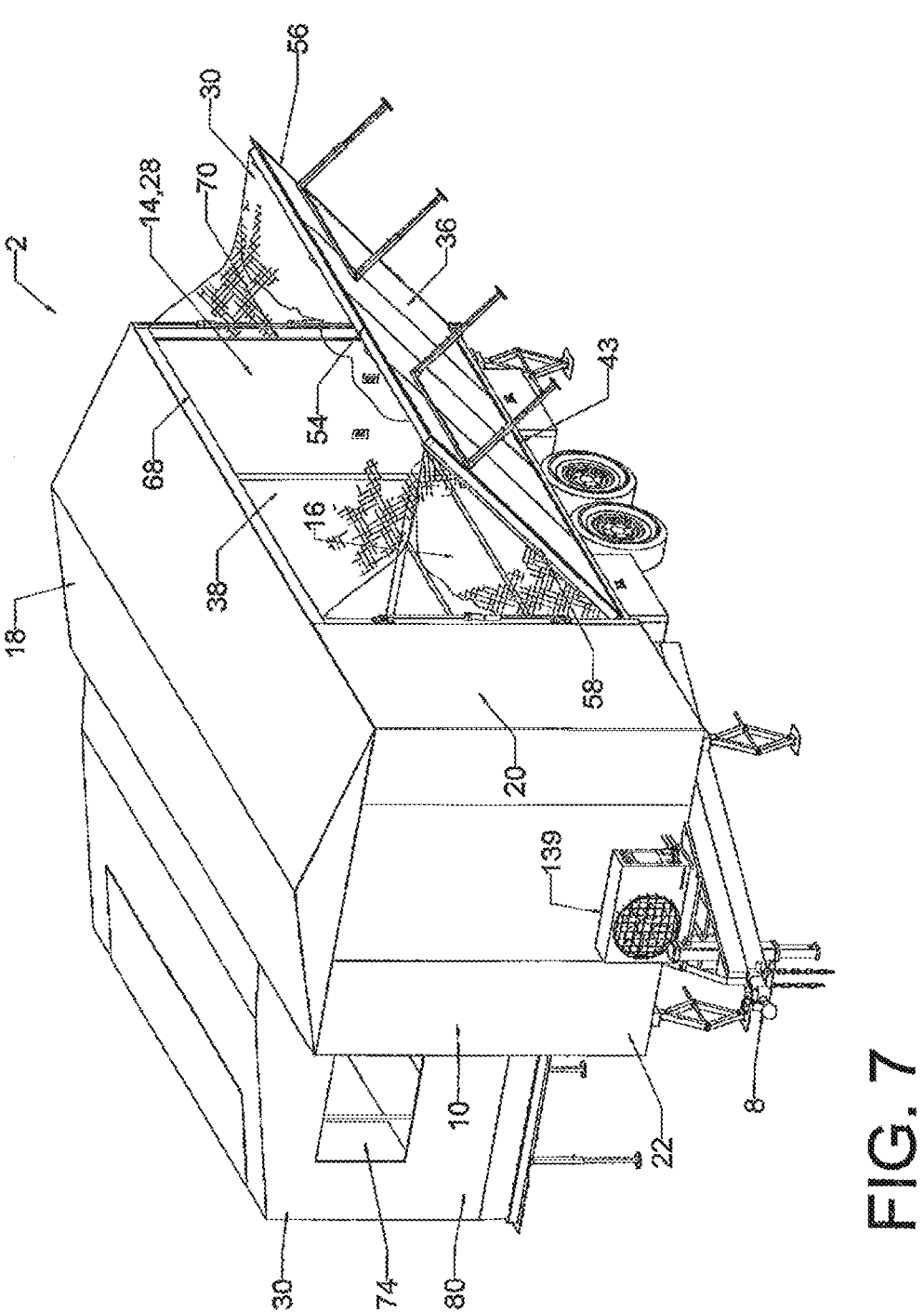
FIG. 7 is another perspective view of the inventive trailer 2.
Figure 8:
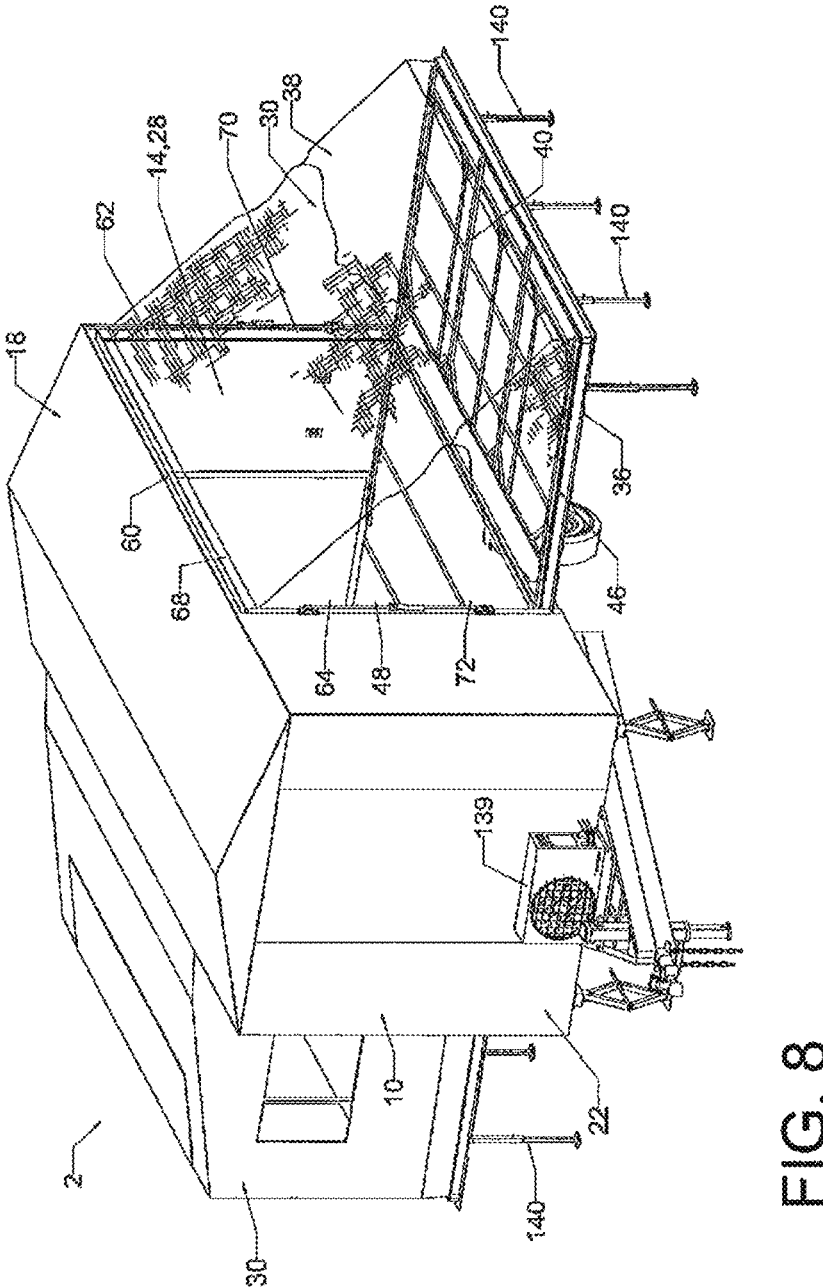
FIG. 8 is another perspective view of the inventive trailer 2.
Figure 9:
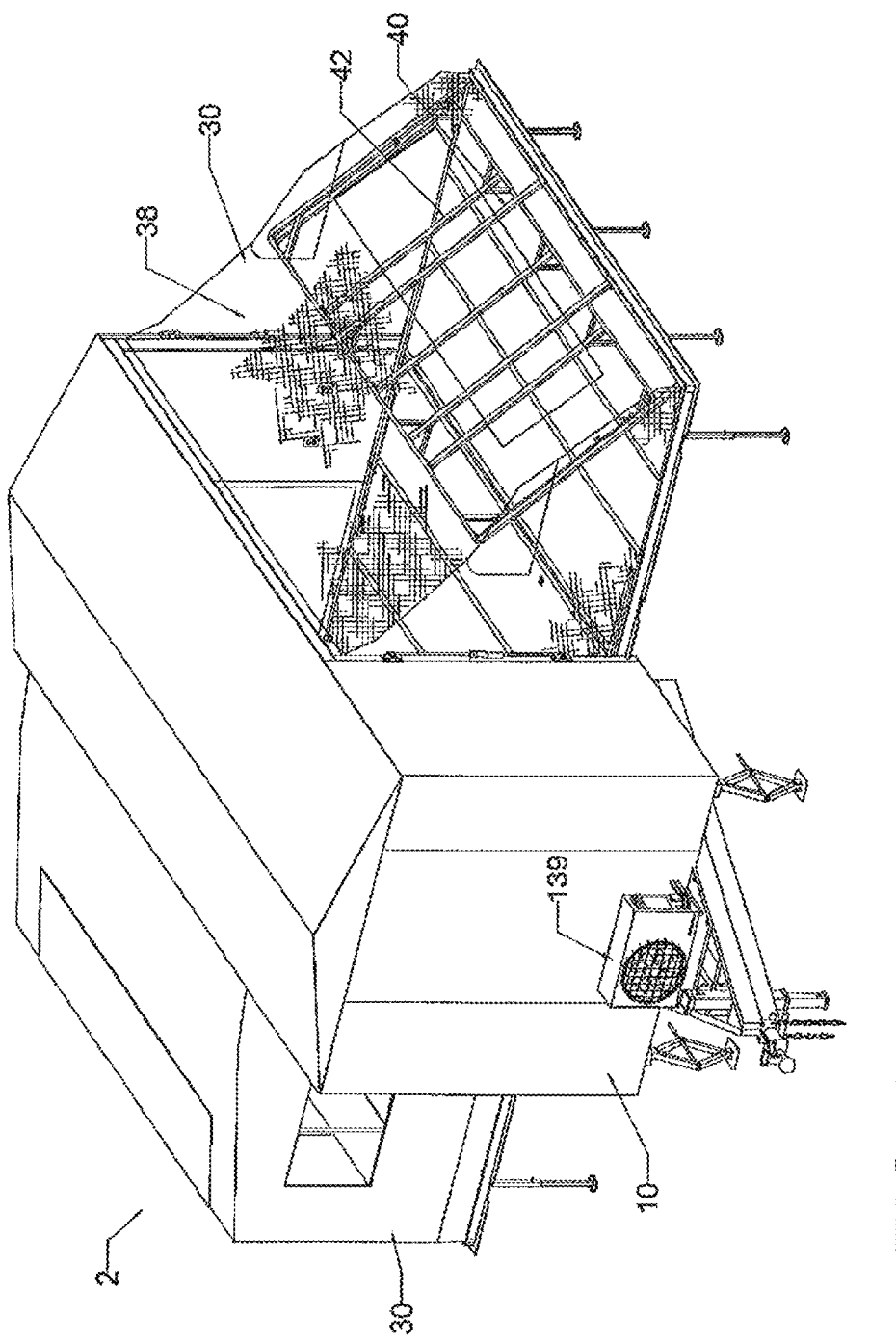
FIG. 9 is another perspective view of the inventive trailer 2.
Figure 10:
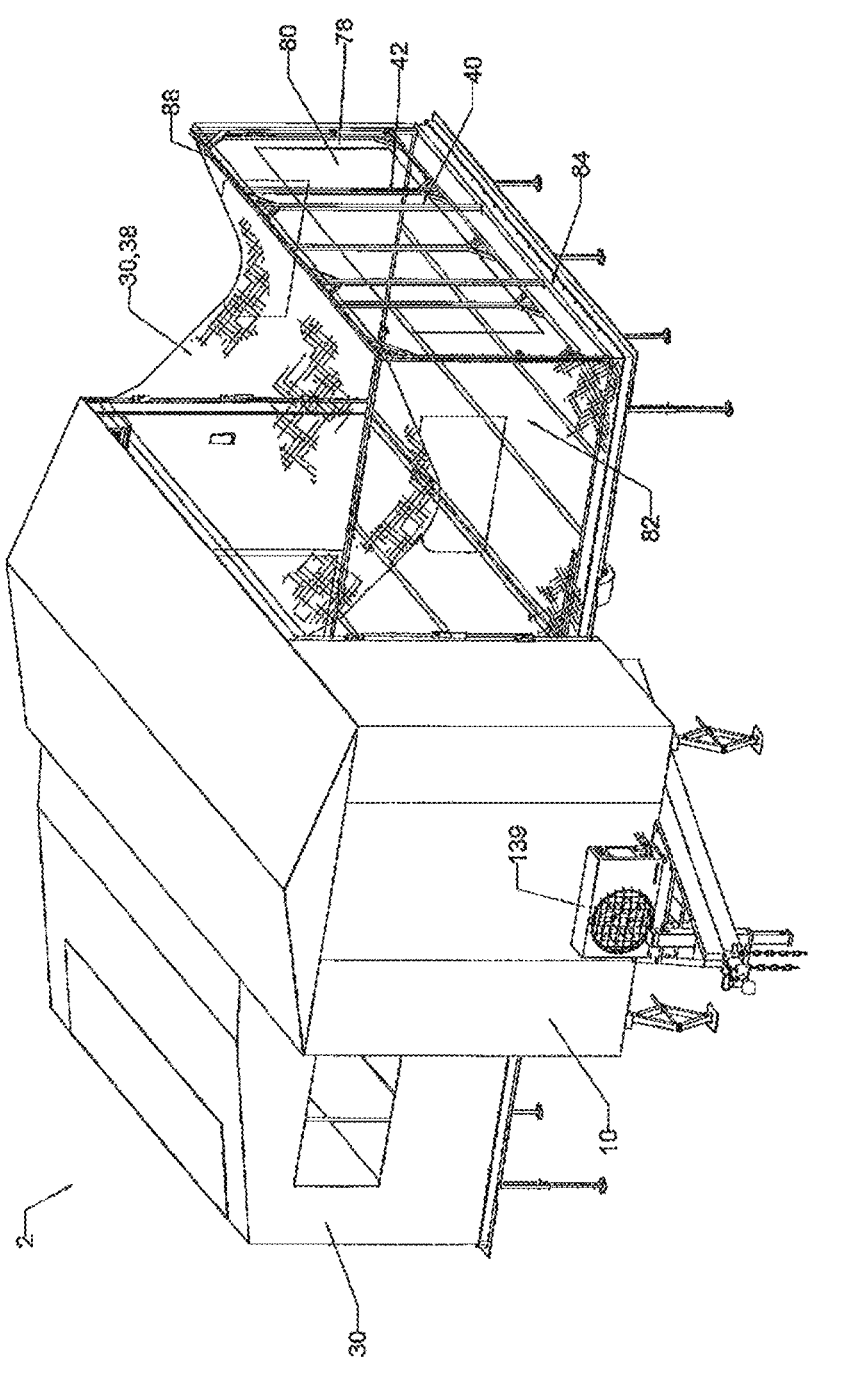
FIG. 10 is another perspective view of the inventive trailer 2.
Figure 11:
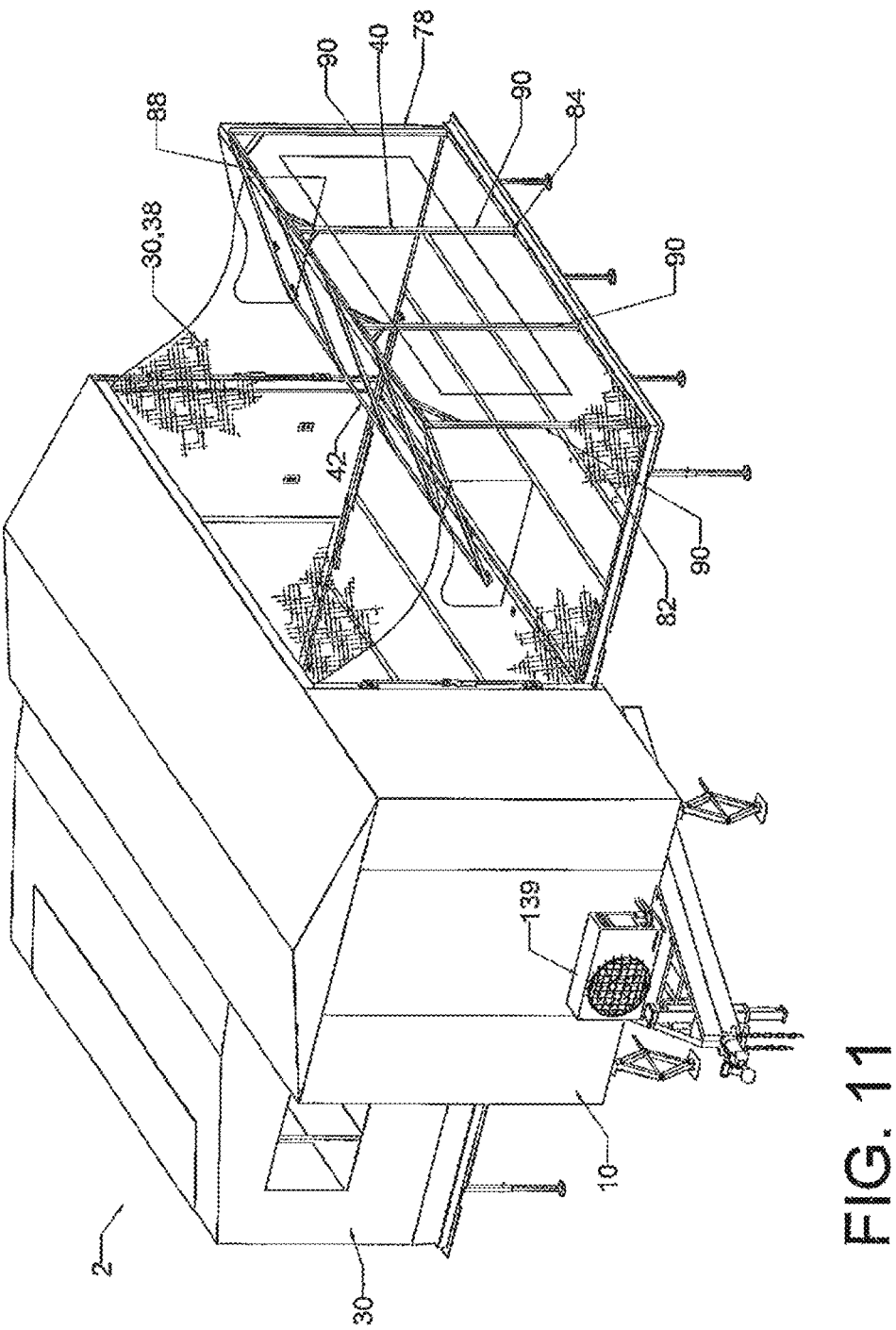
FIG. 11 is another perspective view of the inventive trailer 2.
Figure 12:
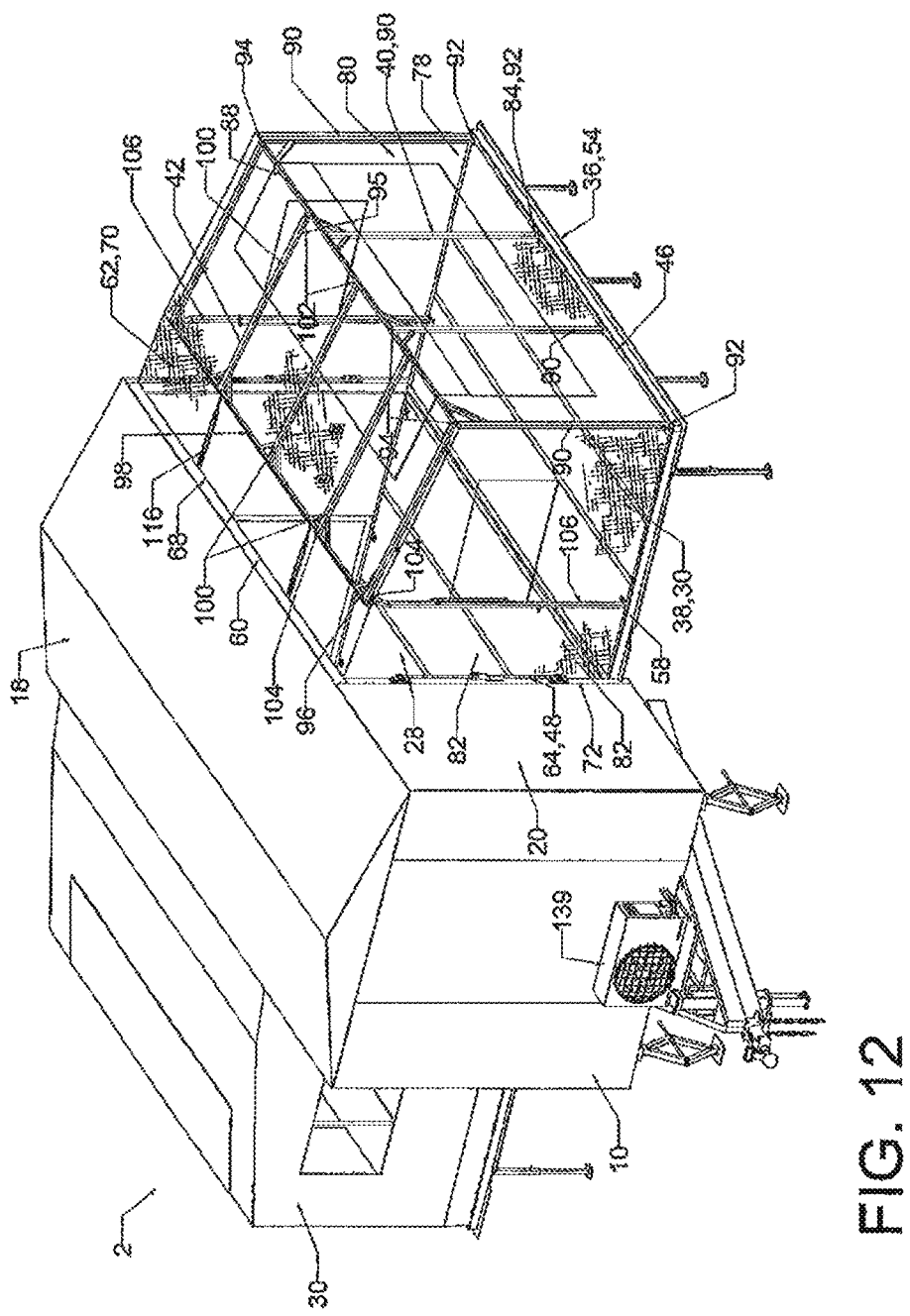
FIG. 12 is another perspective view of the inventive trailer 2.
Figure 13:
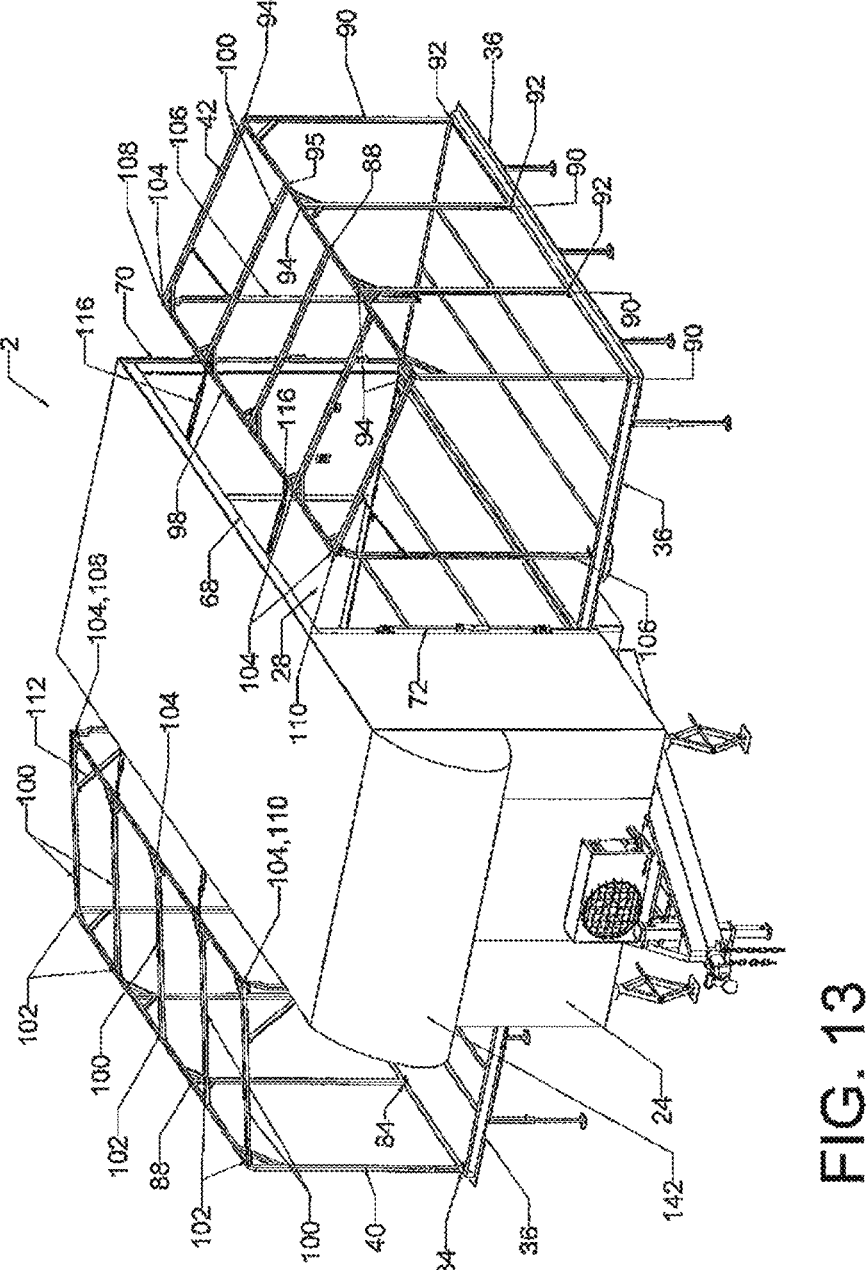
FIG. 13 is another perspective view of the inventive trailer 2 with the collapsible tents 38 thereof removed.

By way of example, but not by way of limitation, the roof 18 of the cargo housing 10 can be a flat roof, as shown in FIG. 1, or a gable-type roof, as illustrated in FIG. 2, having (a) a right lateral half 27 which slopes downwardly as it extends laterally outward to the right and (b) a left lateral half 29 which slopes downwardly as it extends laterally outward to the left.

On one or both of the first and second sides 20 and/or 26 of the cargo housing 10, the inventive trailer 2 preferably also comprises: (i) a side opening 28 and (ii) a tent compartment assembly 30 which is associated with the side opening 28.

In each case, the side opening 28 preferably (a) extends upwardly from the cargo bed 16 to the roof 18 of the cargo housing 10 and (b) has a longitudinal length 32 which is at least half, more preferably at least two thirds, of the longitudinal distance 34 measured from the rearward longitudinal end 22 to the forward longitudinal end 24 of the cargo housing 10. The longitudinal length 32 of each side opening 28 can be substantially equal to the longitudinal length 34 of the cargo housing 10 but will more preferably be in the range of from 60% to 90%, or from 65% to 85% or from 65% to 80%, of the longitudinal length 34 of the cargo housing 10.

Each tent compartment assembly 30 used in the inventive trailer 2 preferably comprises: a side panel 36; a collapsible tent 38; a tent wall frame 40; and a tent roof frame 42. The side panel 36 has a lower end 43 which is pivotably connected to the cargo housing 10 for pivoting the side panel 36 (i) from a raised (preferably vertical or substantially vertical) position, in which the side panel 36 covers and closes the side opening 28, to at least (ii) a lowered/deployed (preferably horizontal or substantially horizontal) position in which the side panel 36 becomes a floor of the tent compartment assembly 30. For each tent compartment assembly 30, latches 44 are provided on the cargo housing 10 for releasably latching the side panel 36 in its closed/raised position over the side opening 28.

The collapsible tent 38 of each tent compartment assembly 30 preferably comprises (a) a tent bottom end 46 which is attached to the side panel 36 of the tent compartment assembly 30 and (b) an inner side 48 which is attached to the cargo housing 10. The bottom end 46 of the tent 38 comprises outer, rearward, and forward edges which are preferably attached (using, e.g., flat aluminum strips 50 and bolts 52) along at least most (more preferably along all or substantially all) of the entire length of each of (i) the longitudinally extending outer edge 54 of the side panel 36, (ii) the rearward edge 56 of the side panel 36, and (iii) the forward edge 58 of the side panel 36. The rearward and forward edges 56 and 58 of the side panel 36 are preferably perpendicular to the longitudinally extending outer edge 54.

When referring to lengths, distances, angles, or areas, the term "substantially," as used herein and in the claims, means at least 95%. When referring to "vertical" or "horizontal" orientations, the term "substantially," as used herein and in the claims, means within a range of ±10°.

Similarly, for each tent compartment assembly 30, the inner side 48 of the collapsible tent 38 comprises a longitudinal upper edge 60, a substantially vertical rearward edge 62, and a substantially vertical forward edge 64 which are preferably attached (using, e.g., flat aluminum strips 65 and bolts 66) along at least most (more preferably along all or substantially all) of the entire length of each of the longitudinal top end 68, the substantially vertical rearward end 70, and the substantially vertical forward end 72 of the corresponding side opening 28 of the cargo housing 10. When the inner side 48 of the collapsible tent 38 is attached over a side opening 28 of the cargo housing 10 in this or a similar manner, the side opening 28 of the cargo housing 10 becomes an entryway for the tent compartment assembly 30 when the side panel 36 of the tent compartment assembly 30 is placed in its substantially horizontal deployed position.

By way of example, but not by way of limitation, the collapsible tent 38 of each collapsible tent assembly 30 will preferably be formed of waterproof polyester fabric, nylon fabric, other plastic, canvas, sailcloth, hemp fabric, flax fabric, cotton fabric, or a combination thereof. The collapsible tent 38 can also include any number and any type of open, plastic, or other tent windows 74, with or without fabric, plastic, mesh, or other covers 76. One or more windows 74 can be provided in any of the substantially vertical outer wall 78, the substantially vertical rearward wall 80, and/or the substantially vertical forward wall 82 of the tent 38.

The tent wall frame 40 of each tent compartment assembly 30 is preferably a flat frame having a lower end 84 which is pivotably attached to the side panel 36 of the tent compartment assembly 30 so that when the side panel 36 is in its substantially horizontal deployed position, the tent wall frame 40 can be pivoted upwardly inside the collapsible tent 38 (as sequentially illustrated in FIGS. 6-10) to a raised position in which the tent wall frame 40 raises and supports the outer substantially vertical wall 78 of the collapsible tent 38. When the outer wall 78 of the collapsible tent 38 is raised by the tent wall frame 40, the outer wall 78 of the collapsible tent 38 is opposite, and will preferably be substantially parallel to, both the inner side 48 of the tent 38 and the side opening 28 of the cargo housing 10.

The longitudinal length of the tent wall frame 40 is preferably (i) at least 90% of the longitudinal length 32 of the side opening 28 of the cargo housing 10 but (ii) less than the longitudinal length 32 of the side opening 28 so that the tent wall frame 40 will be received through the side opening 28 when the side panel 36 of the collapsible compartment assembly 30 is raised to its closed position. The lower end 84 of the tent wall frame 40 is preferably pivotably attached along and at or near the substantially longitudinally extending outer edge 54 of the side panel 36 such that the lower end 84 of the tent wall frame 40 will also be received through the side opening 28 of the cargo housing 10 when the side panel 36 is closed.

The tent wall frame 40 preferably comprises: (i) a distal, longitudinally extending frame member 88 which is preferably parallel to the side panel 36 and (ii) a plurality of connecting frame members 90 which extend between the side panel 36 and the distal, longitudinally extending frame member 88. The connecting frame members 90 of the tent wall frame 40 preferably have proximal ends 92 which are pivotably connected to the side panel 36 and distal ends 94 which are connected to the distal, longitudinally extending frame member 88 of the tent wall frame 40.

The tent roof frame 42 of the tent compartment assembly 30 is preferably a flat frame having a proximal end 95 which is pivotably attached to the tent wall frame 40 so that when the tent wall frame 40 is pivoted upwardly to the raised position of the tent wall frame 40, the tent roof frame 42 can be pivoted upwardly inside the collapsible tent 38 to a raised position to raise and support a roof 96 of the collapsible tent 38.

The tent roof frame 42 preferably comprises: (i) a distal, longitudinally extending frame member 98 which is preferably parallel to the distal, longitudinally extending frame member 88 of the tent wall frame 40 and (ii) a plurality of connecting frame members 100 which extend between the distal, longitudinally extending frame member 88 of the tent wall frame 40 and the distal, longitudinally extending frame member 98 of the tent roof frame 42. The connecting frame members 100 of the tent roof frame 42 preferably have proximal ends 102 which are pivotably connected to the distal, longitudinally extending frame member 88 of the tent wall frame 40 and distal ends 104 which are connected to the distal, longitudinally extending frame member 98 of the tent roof frame 42.

Each tent compartment assembly 30 also preferably comprises a pair of vertical support poles 106 which are removably installed between the lowered side panel 36 of the compartment assembly 30 and the tent roof frame 42 in order to hold the tent roof frame 42 and the roof 96 of the tent 38 in raised position. The two vertical support poles 106 preferably extend from the lowered side panel 36 to the rearward and forward distal/inner corners 108 and 110 of the tent roof frame 42. Additional angled supports 112 and 114 are also preferably provided which extend at an angle between the vertical support poles 106 and the outer (i.e., the rearward-most and forward-most) connecting members 100 of the tent roof frame 42.

In addition, each tent compartment assembly 30 preferably further comprises one or more, preferably a plurality, of tensioners 116 which extend from the distal, longitudinally extended frame member 98 of the tent roof frame 42 to the underside of the roof 18 of the cargo housing 10. The one or more tensioners 116 tension/pull the tent roof frame 42 toward the roof 18 of the cargo housing 10 to stretch the collapsible tent 38. This makes the collapsible tent 38 more taught and prevents sagging.

Figure 14:
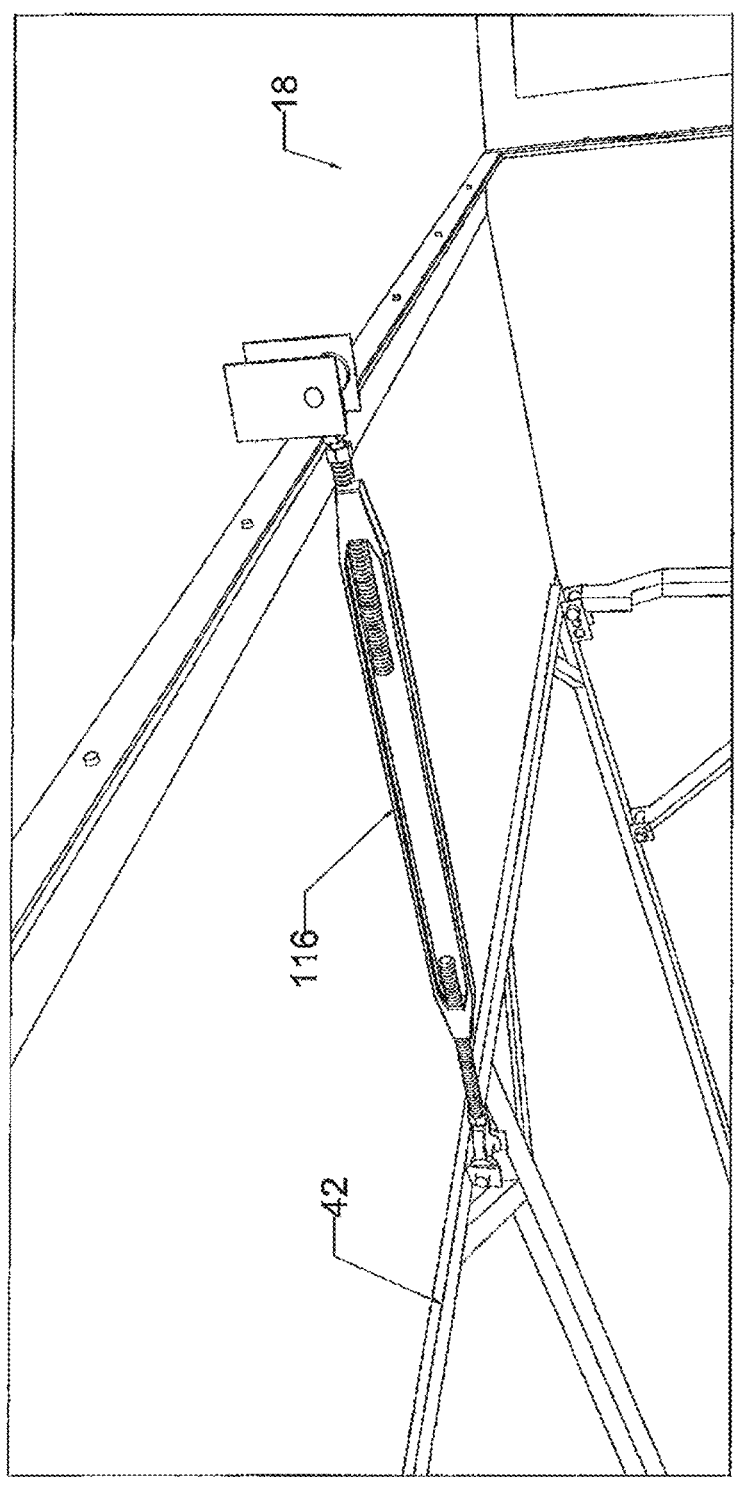
FIG. 14 is an upper interior view of the inventive trailer 2.
Figure 15:
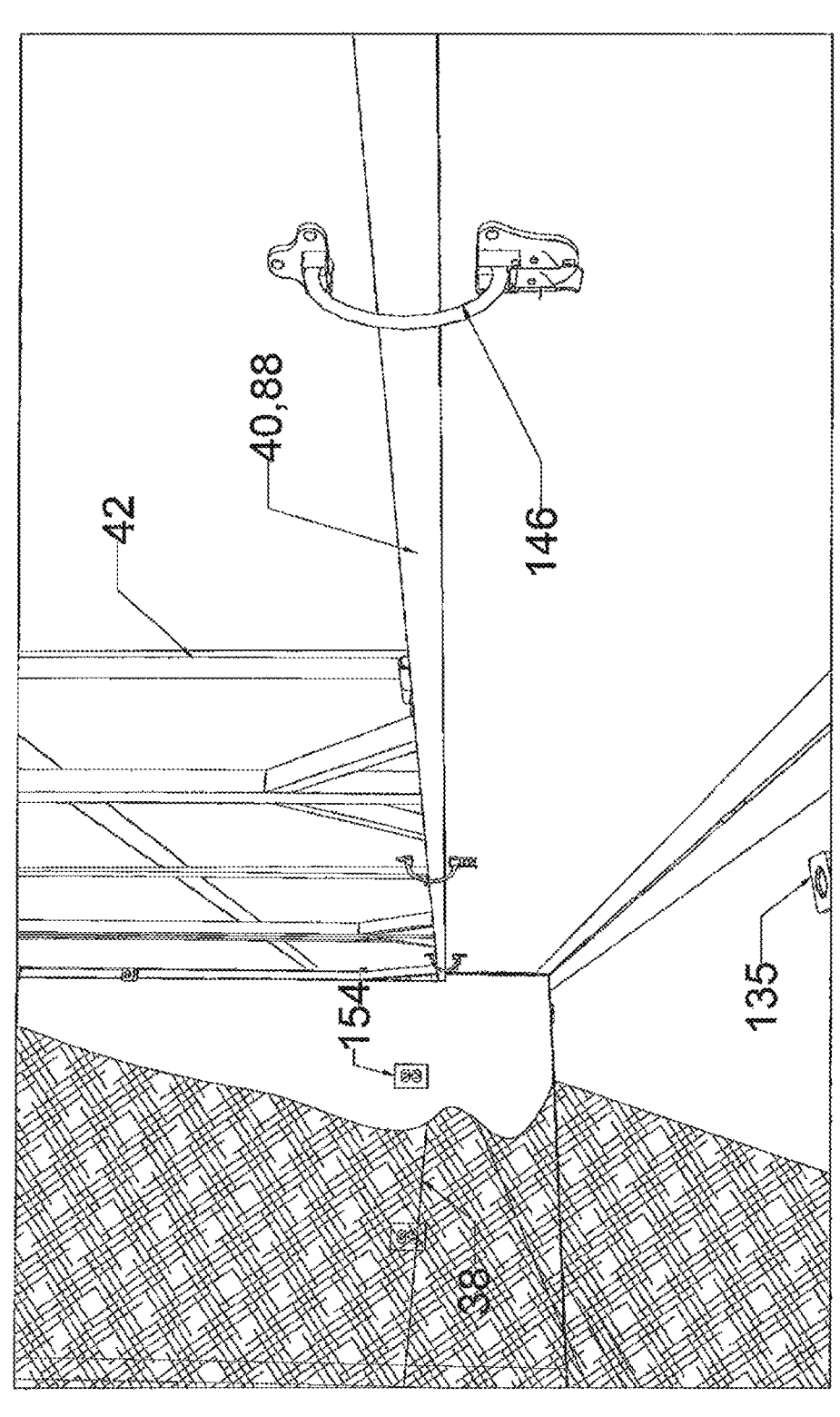
FIG. 15 is a side interior view of the inventive trailer 2.
Figure 16:
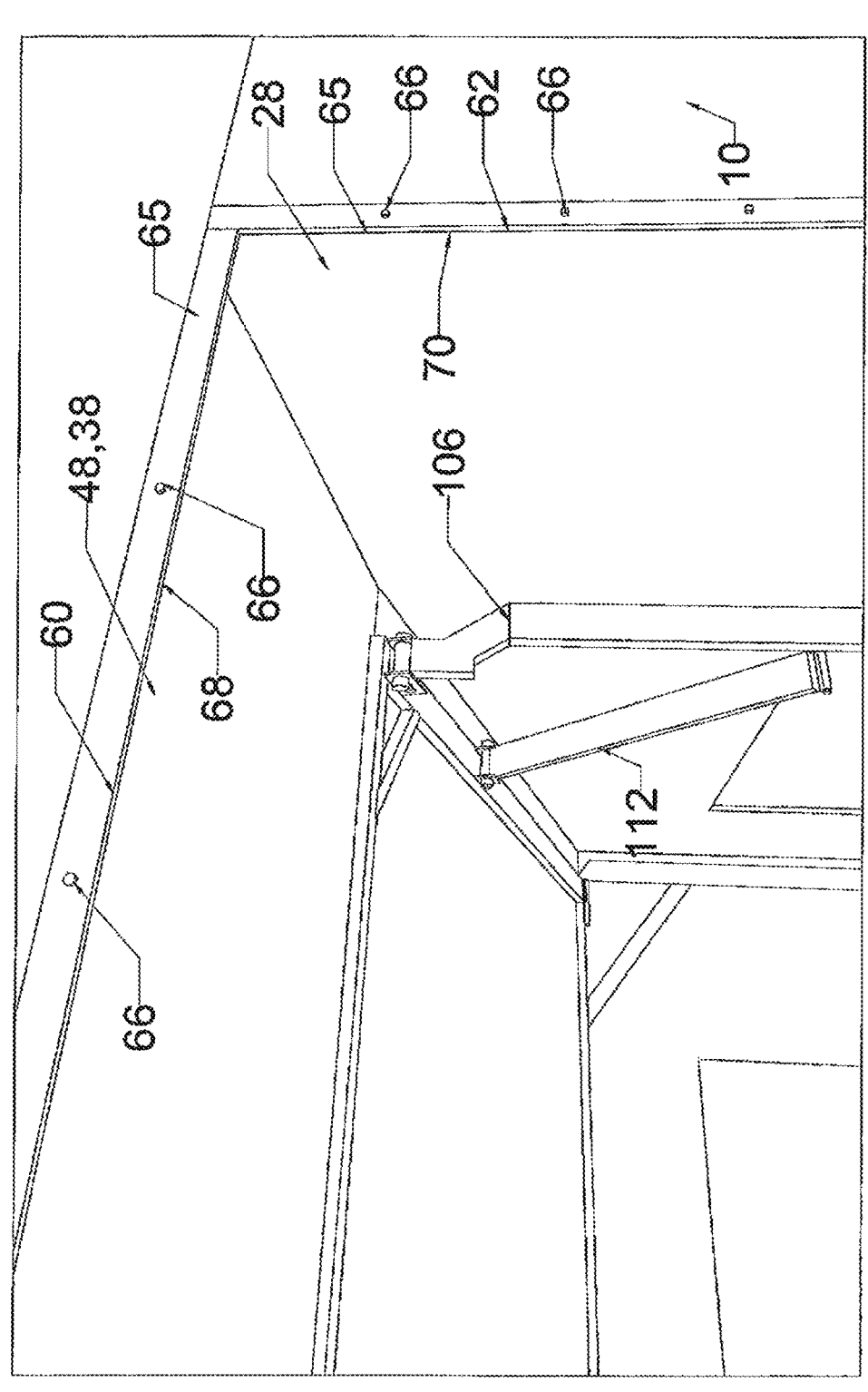
FIG. 16 is another upper interior view of the inventive trailer 2.
Figure 17:
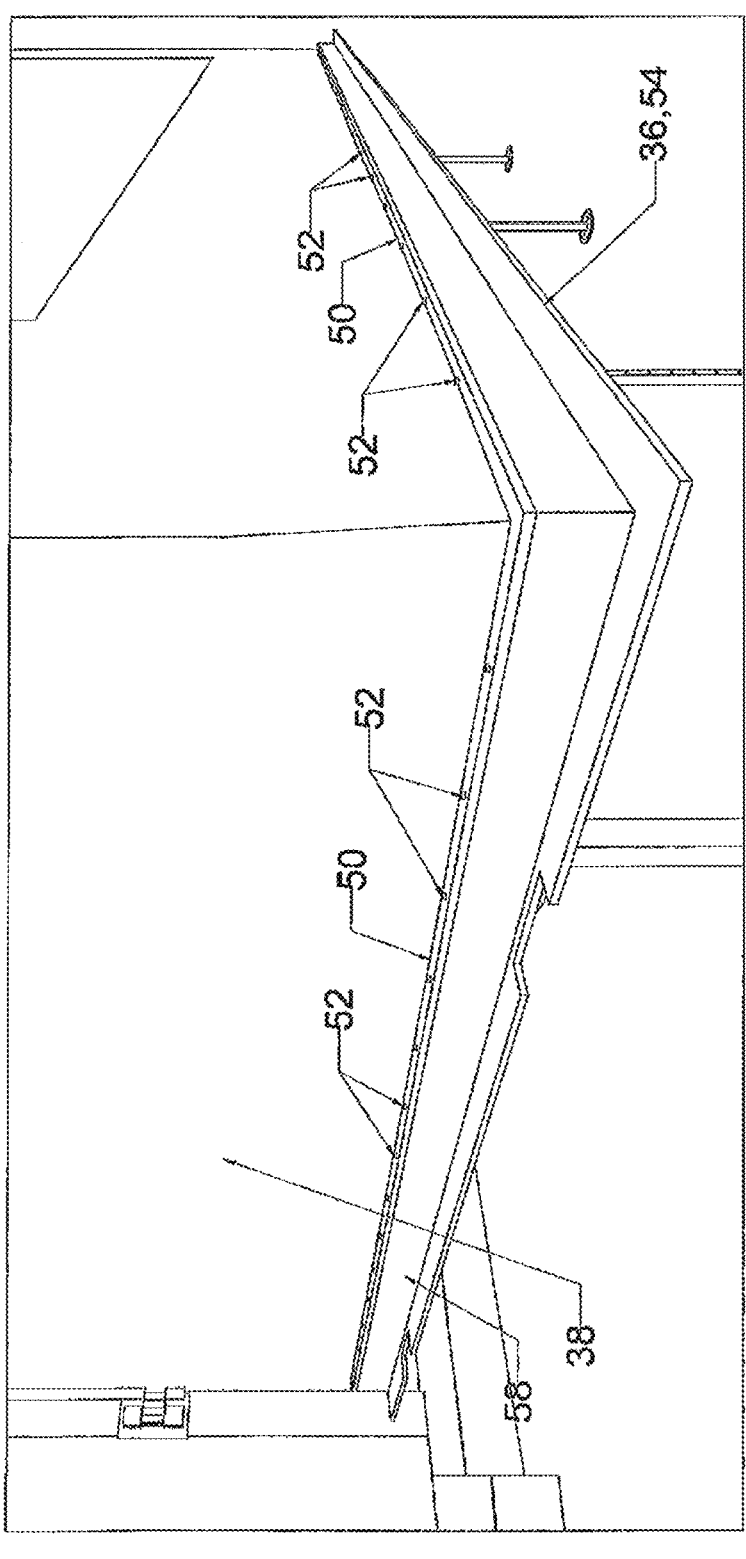
FIG. 17 is a partial exterior view of the inventive trailer 2.
Figure 18:
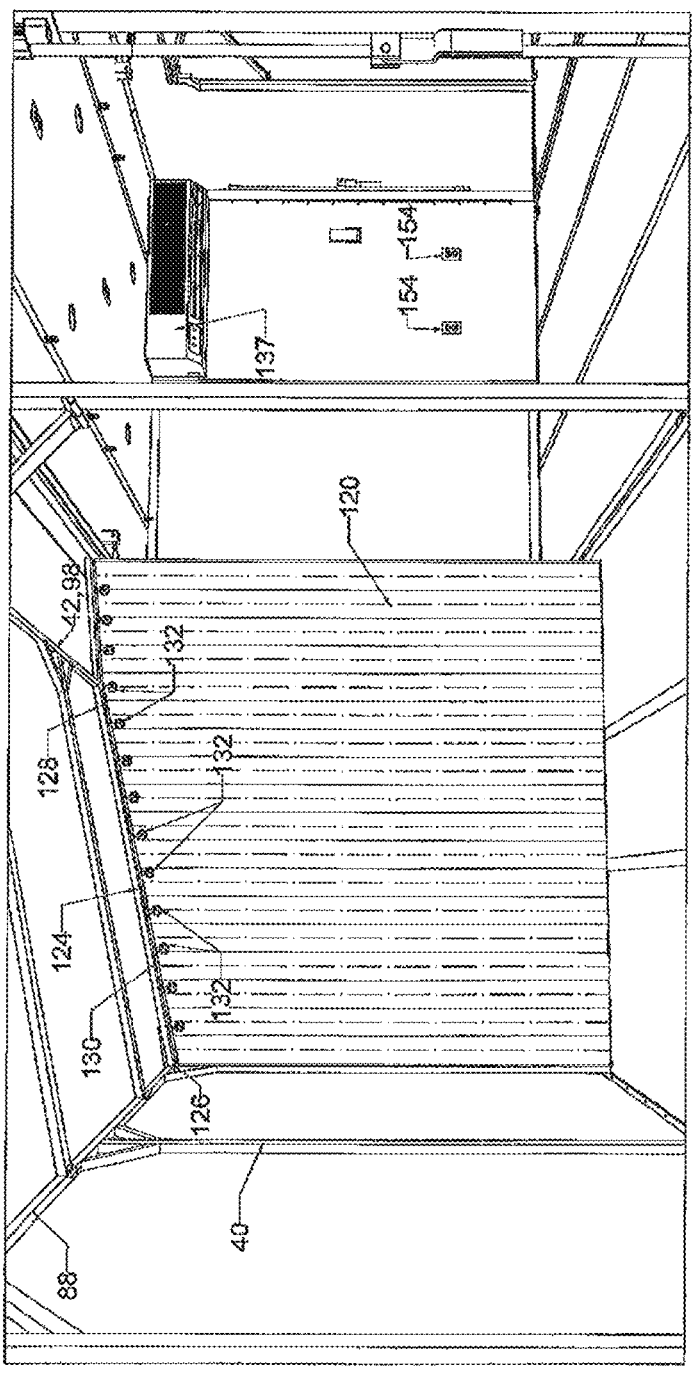
FIG. 18 is an interior view of the inventive trailer 2 with the collapsible tents 38 thereof removed.
Figure 19:
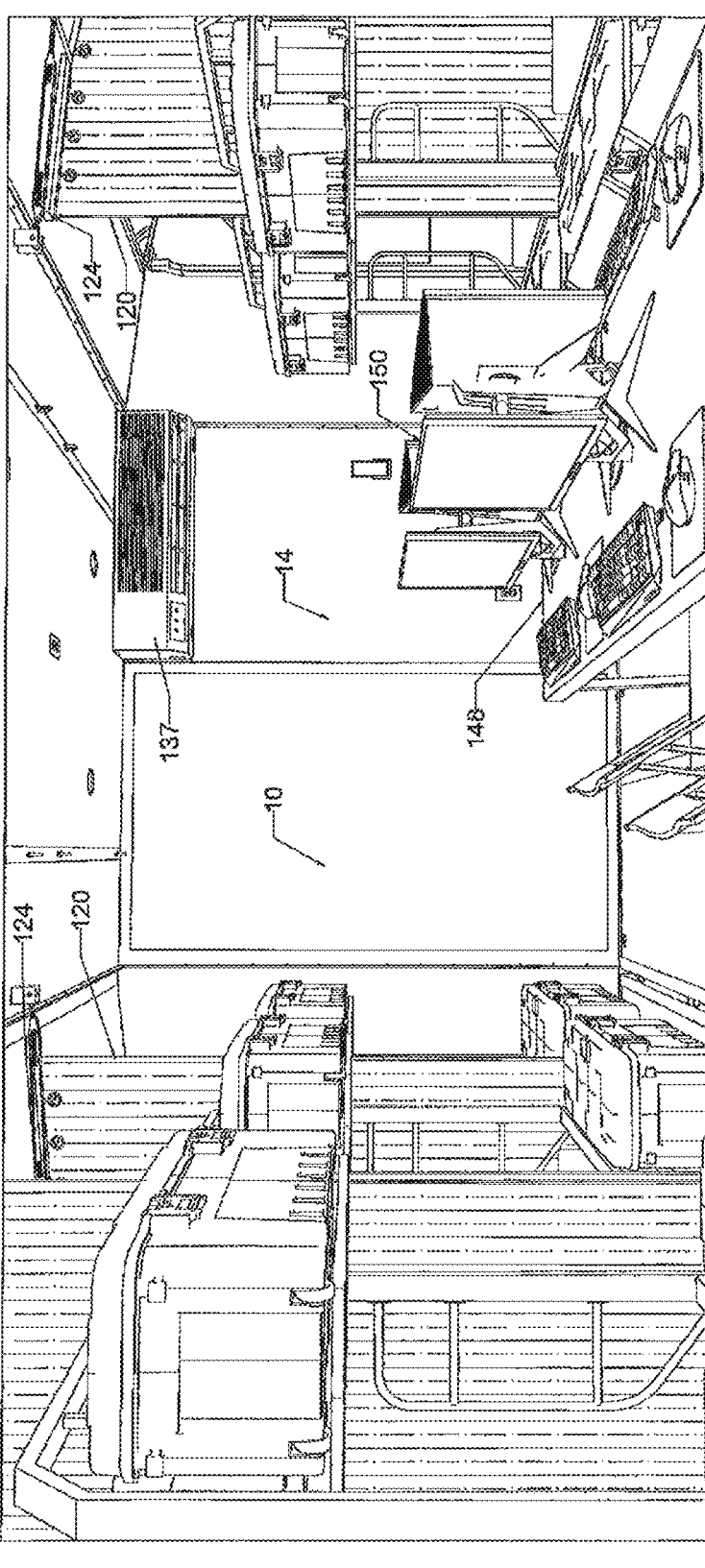
FIG. 19 is a rearward facing interior view of the inventive trailer 2.
Figure 20:
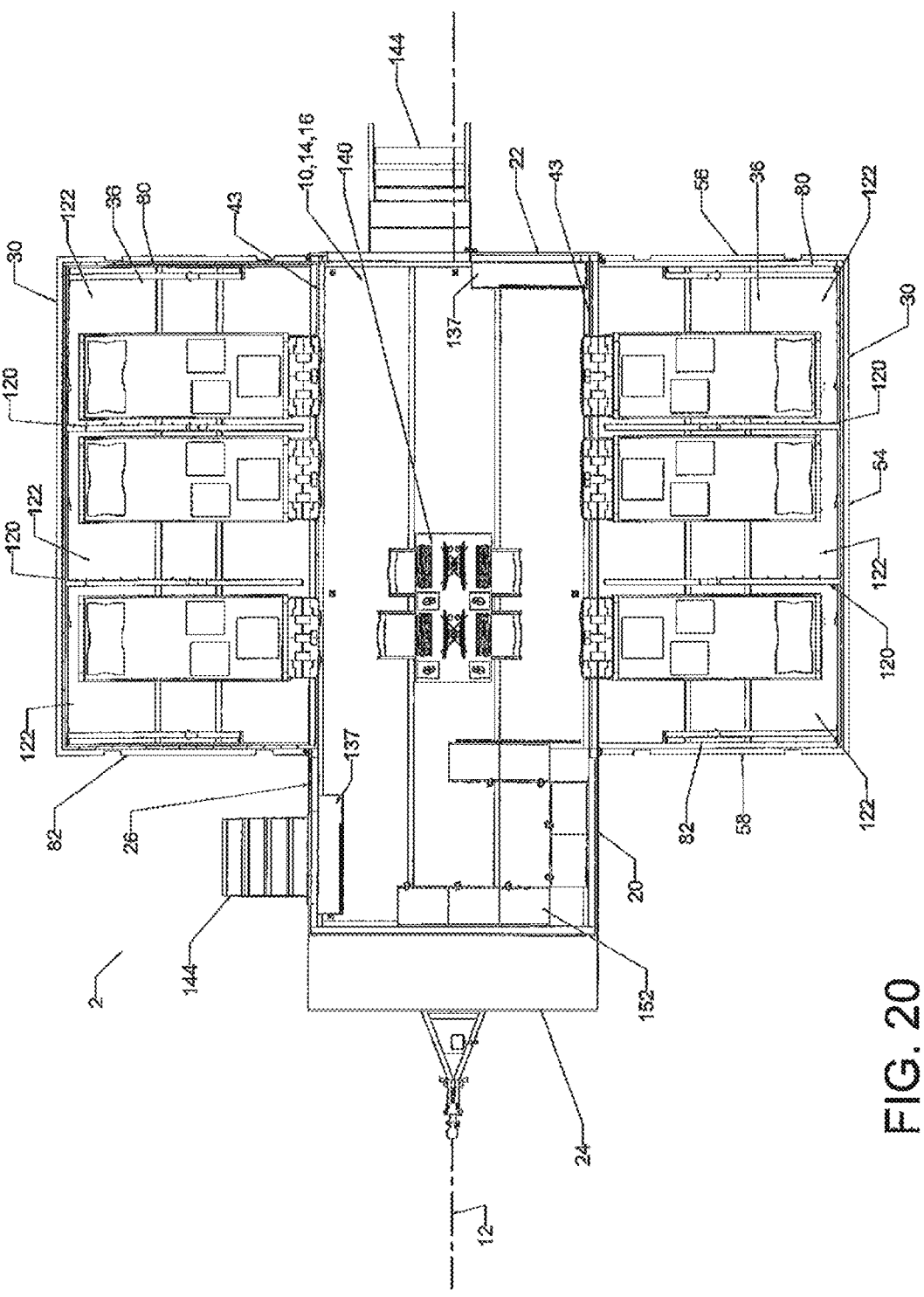
FIG. 20 is a cutaway top view of the inventive trailer 2.
Figure 21:
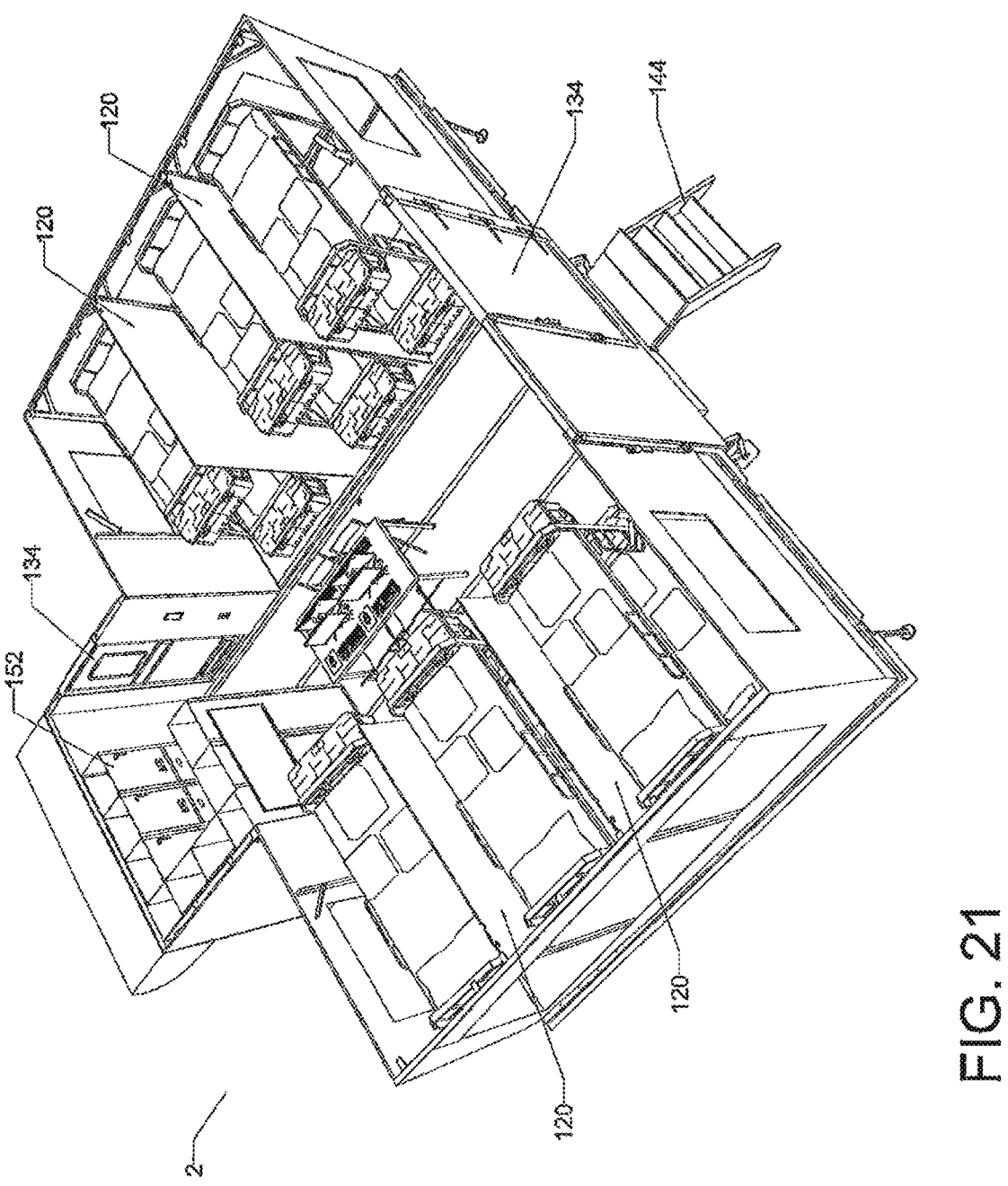
FIG. 21 is a cutaway top perspective view of the inventive trailer 2.

By way of example, but not by way of limitation, the one or more tensioners 116 can be bungy cords, having attachment hooks on the ends thereof, which extend, e.g., between attachment loops provided on the tent roof frame 42 and on the underside of the roof 18 of the cargo housing 10. As another example, the one or more tensioners 116 can be mechanical, threaded, open-body turnbuckle-type tensioners as illustrated in FIG. 14. Mechanical tensioners such as shown in FIG. 14 can be used to not only pull the tent roof frame 42 toward the roof 18 of the cargo housing, but to alternatively tension the tent roof frame 42 away from the roof 18 if needed to make the collapsible tent 38 more taught and prevent sagging.

To provide greater privacy, efficiency, and/or organization, each tent compartment assembly 30 also preferably includes one or more dividers 120. The one or more dividers 120 are preferably laterally oriented so that they can be (i) expanded toward the cargo housing 10 to divide the tent compartment assembly 30 into a series of two or more sleeping, working, medical treatment, or other areas 122 or (ii) retracted toward the outer wall 80 of the tent 38 for use of the tent compartment 30 as an open area for dining or any other purpose.

By way of example, but not by way of limitation, the one or more dividers 120 can be suspended from divider rods 124 which are removably positionable in the tent compartment assembly 30 when the tent wall frame 40 and the tent roof frame 42 are pivoted to their raised positions. The divider rods 124 can be held in the tent compartment assemble 30 in any manner suitable for suspending, and preferably also for extending and retracting, the dividers 120.

Also by way of example, but not by way of limitation, each of the one or more divider rods 124 preferably has (i) a proximal end or a proximal end portion 126 which is removably placed on or otherwise supported by the distal, longitudinally extending frame member 88 of the tent wall frame 40 and (ii) a distal end or a distal end portion 128 which is removably placed on or otherwise supported by the distal, longitudinally extending frame member 98 of the tent roof frame 42.

When extended, each of the suspended dividers 120 can divide the tent compartment assembly 30 into (a) a bunk, office, or other area 122 on the longitudinally rearward side of the divider 120 and (b) a separate bunk, office, or other area 122 on the longitudinally forward side of the divider 120. Examples of dividers 120 suitable for use in the tent compartment assembly 30 include, but are not limited to, curtains or accordion-type dividers. Each divider 120 will preferably be a curtain having an upper end 130 which is slidably suspended from a corresponding divider rod 124 using a plurality of curtain hooks and/or loops 132.

It will be understood that any desired number of dividers 120 can be used to divide each tent compartment assembly 30 into any desired number of subcompartments. It will also be understood that the divider rods 124 can be placed laterally across the distal, longitudinally extending frame member 88 of the tent wall frame 40 and the distal, longitudinally extending frame member 98 of the tent roof frame 42 at any locations desired to so that the width of the subcompartments can be the same or different. Also, the divider rods 124 can be moved and/or the number of the divider rods 124 can be changed to add or subtract subcompartments and/or change or vary the widths thereof.

It will be further understood that similar divider rods can be placed longitudinally across the lateral connecting frame members 100 of the tent roof frame 42 to provide adjustable dividers which extent longitudinally in the tent compartment assembly 30.

Doors 134 can be provided in any one or more of the first side 20, the second side 26, and/or the rear wall 136 of the cargo housing 10. A door 134 will preferably be provided in either the first side 20 or the second side 26 of the cargo housing 134. If the door 134 is provided in a side 20 or 26 having a side opening 28 therein, the door 134 will preferably be located forwardly of the substantially vertical forward end 72 or rearwardly of the substantially vertical rearward end 70 of the side opening 28.

The inventive trailer 2 and truck 200 will preferably further include: tie-down rings or hooks 135 in the cargo bed 16 for securing pallets and cargo; climate control system interior units 137; and climate control system exterior units 139.

The inventive trailer 2, or the inventive truck 200, can also include or use any or all of: (a) scissor screw jacks 136 or similar devices for leveling the cargo bed 16 of the cargo housing 10; (b) one or more storage compartments 138 secured below the cargo bed 16 or elsewhere; (c) adjustable legs 140 removably attachable to the exterior side of the side panel 36 of each tent compartment assembly 30 to support and level the side panel 36 in its lowered/deployed position; (d) a wind nose or cone 142, e.g., of the type commonly used on trailers and trucks, which projects from the forward longitudinal end 24 of the cargo housing 10 to reduce wind resistance and increase fuel efficiency; (e) at least one set of stairs 144 which can be carried in the cargo housing 10 during transport; (f) latches 146 which extend over the longitudinally extending distal frame member 88 of each tent compartment assembly 30 to hold the tent wall frame 40 and the tent roof frame 42 against the side panel 36 of the compartment assembly 30 during transport; (g) a conference table 148, work stations 150, and/or personal storage lockers 152 removably or permanently installed in the cargo housing 10; (h) an aluminum sheeting exterior that can be wrapped with any logo, design, or color; (i) a 50 amp or other electrical panel for hook-up to a power grid or to an electrical generator; (j) interior power outlets 154 and lighting 155; and/or (k) any hook-ups and supports needed for water, climate control units, etc.

Thus, the present invention is well adapted to carry out the objectives and attain the ends and advantages mentioned above as well as those inherent therein. While presently preferred embodiments have been described for purposes of this disclosure, numerous changes and modifications will be apparent to those in the art. Such changes and modifications are encompassed within the invention as defined by the claims.

What is claimed is:

1. A trailer or truck comprising:

a cargo housing having (i) a cargo compartment therein, (ii) a cargo bed which extends longitudinally in a bottom of the cargo housing, (iii) a roof spaced above the cargo bed, (iv) a first substantially vertical side which extends longitudinally between a rearward longitudinal end and a forward longitudinal end of the cargo housing, and (v) a second substantially vertical side, opposite the first substantially vertical side, which extends longitudinally between the rearward longitudinal end and the forward longitudinal end;

at least the first substantially vertical side having a side opening therein, the side opening having a longitudinal length which is at least half of a longitudinal distance measured from the rearward longitudinal end to the forward longitudinal end of the cargo housing; and a tent compartment assembly comprising a side panel having a proximal lower end which is pivotably connected to the cargo housing for pivoting the side panel (i) from a raised position, in which the side panel covers the side opening, to at least (ii) a lowered position in which the side panel becomes a floor of the tent compartment assembly, a collapsible tent having (i) a bottom end which is attached the side panel and (ii) an inner side which is connected to the cargo housing along at least most of a longitudinal top, at least most of a substantially vertical forward end, and at least most of a substantially vertical rearward end of the side opening of the cargo housing so that the side opening of the cargo housing is an entryway for the tent compartment assembly when the side panel is in the lowered position, a tent wall frame having a proximal lower end which is pivotably attached to a distal outer end portion of the side panel so that when the side panel is in the lowered position, the tent wall frame can be pivoted upwardly inside the collapsible tent to a raised position in which the tent wall frame raises and supports an outer wall of the collapsible tent, wherein when the outer wall of the collapsible tent is raised, it is opposite the inner side of the collapsible tent, and a tent roof frame having a proximal end which is pivotably attached to a distal end of the tent wall frame so that when the tent wall frame is pivoted upwardly to the raised position of the tent wall frame, the tent roof frame can be pivoted upwardly inside the collapsible tent to a raised position to raise and support a roof of the collapsible tent.

2. The trailer or truck of claim 1 further comprising the side opening in the first substantially vertical side extending upwardly from the cargo bed to the roof of the cargo housing.

3. The trailer or truck of claim 2 further comprising the longitudinal length of the side opening being at least two thirds of the longitudinal distance measured from the rearward longitudinal end to the forward longitudinal end of the cargo housing.

4. The trailer or truck of claim 1 further comprising:

the tent wall frame having a distal, longitudinally extending frame member;

the tent roof frame having a distal, longitudinally extending frame member which is parallel to the distal, longitudinally extending frame member of the tent wall frame;

one or more divider rods removably positionable in the tent compartment assembly when the tent wall frame and the tent roof frame are pivoted to their raised positions;

each of the one or more divider rods having (i) a proximal end or a proximal end portion which is removably supported by the distal, longitudinally extending frame member of the tent wall frame and (ii) a distal end or a distal end portion which is removably supported by the distal, longitudinally extending frame member of the tent roof frame; and each of the one or more divider rods having a divider which is suspended from the divider rod such that the divider can be extended to divide the tent compartment assembly into a sleeping, working, or other area on a longitudinally rearward side of the divider and a sleeping, working, or other area on a longitudinally forward side of the divider.

5. The trailer or truck of claim 4 further comprising the divider which is suspended from each of the one or more divider rods being a curtain having an upper end which is slidably suspended from the divider rod using a plurality of curtain hooks and/or loops.

6. A trailer or truck comprising:

a cargo housing having (i) a cargo compartment therein, (ii) a cargo bed which extends longitudinally in a bottom the cargo housing, (iii) a roof spaced above the cargo bed, (iv) a first substantially vertical side which extends longitudinally between a rearward longitudinal end and a forward longitudinal end of the cargo housing, and (v) a second substantially vertical side, opposite the first substantially vertical side, which extends longitudinally between the rearward longitudinal end and the forward longitudinal end;

each of the first and second substantially vertical sides having a side opening therein having a longitudinal length which is at least half of a longitudinal distance measured from the rearward longitudinal end to the forward longitudinal end of the cargo housing; and the side opening of each of the first and second substantially vertical sides having a tent compartment assembly associated therewith which comprises a side panel having a lower end which is pivotably connected to the cargo housing for pivoting the side panel (i) from a raised position, in which the side panel covers the side opening, to at least (ii) a lowered position in which the side panel becomes a floor of the tent compartment assembly, a collapsible tent having (i) a bottom end which is attached the side panel and (ii) an inner side which is connected to the cargo housing along at least most of a longitudinal top, at least most of a substantially vertical forward end, and at least most of a substantially vertical rearward end of the side opening of the cargo housing so that the side opening of the cargo housing is an entryway for the tent compartment assembly when the side panel is in the lowered position, a tent wall frame which is pivotably attached to the side panel so that when the side panel is in the lowered position, the tent wall frame can be pivoted upwardly inside the collapsible tent to a raised position in which the tent wall frame raises and supports an outer wall of the collapsible tent, wherein when the outer wall of the collapsible tent is raised, it is opposite the inner side of the collapsible tent, a tent roof frame which is pivotably attached to the tent wall frame so that when the tent wall frame is pivoted upwardly to the raised position of the tent wall frame, the tent roof frame can be pivoted upwardly inside the collapsible tent to a raised position to raise and support a roof of the collapsible tent, and the tent wall frame of the tent compartment assembly associated with the side opening of each of the first and second substantially vertical sides of the cargo housing comprising (i) a distal, longitudinally extending frame member and (ii) a plurality of connecting frame members which extend between the side panel and the distal, longitudinally extending frame member.

7. The trailer or truck of claim 6 further comprising the side opening of each of the first and second substantially vertical sides extending upwardly from the cargo bed to the roof of the cargo housing.

8. The trailer or truck of claim 6 further comprising the connecting frame members of the tent wall frame of the tent compartment assembly associated with the side opening of each of the first and second substantially vertical sides of the cargo housing having proximal ends which are pivotably connected to the side panel of the tent compartment assembly and distal ends which are connected to the distal, longitudinally extending frame member of the tent wall frame.

9. The trailer or truck of claim 6 further comprising the tent roof frame of the tent compartment assembly associated with the side opening of each of the first and second substantially vertical sides of the cargo housing comprising:

a distal, longitudinally extending frame member which is parallel to the distal, longitudinally extending frame member of the tent wall frame of the tent compartment assembly and a plurality of connecting frame members which extend between the distal, longitudinally extending frame member of the tent wall frame and the distal, longitudinally extending frame member of the tent roof frame of the tent compartment assembly.

10. The trailer or truck of claim 9 further comprising, for the tent compartment assembly associated with the side opening of each of the first and second substantially vertical sides of the cargo housing, one or more tensioners which extend from the distal, longitudinally extended frame member of the tent roof frame to an underside of the roof of the cargo housing to tension the tent roof frame toward or away from the roof of the cargo housing.

11. The trailer or truck of claim 9 further comprising the connecting frame members of the tent roof frame of the tent compartment assembly associated with the side opening of each of the first and second substantially vertical sides of the cargo housing having proximal ends which are pivotably connected to the distal, longitudinally extending frame member of the tent wall frame of the tent compartment assembly and distal ends which are connected to the distal, longitudinally extending frame member of the tent roof frame.

12. The trailer or truck of claim 6 further comprising, for the tent compartment assembly associated with the side opening of each of the first and second substantially vertical sides of the cargo housing:

the tent roof frame of the tent compartment assembly having a distal, longitudinally extending frame member which is parallel to the distal, longitudinally extending frame member of the tent wall frame;

one or more divider rods removably positionable in the tent compartment assembly when the tent wall frame and the tent roof frame are pivoted to their raised positions;

each of the one or more divider rods having (i) a proximal end or a proximal end portion which is removably supported by the distal, longitudinally extending frame member of the tent wall frame and (ii) a distal end or a distal end portion which is removably supported by the distal, longitudinally extending frame member of the tent roof frame; and each of the one or more divider rods having a divider which is suspended from the divider rod such that the divider can be extended to divide the tent compartment assembly into a sleeping, working, or other area on a longitudinally rearward side of the divider and a sleeping, working, or other area on a longitudinally forward side of the divider.

13. The trailer or truck of claim 12 further comprising, for the tent compartment assembly associated with the side opening of each of the first and second substantially vertical sides of the cargo housing, the divider which is suspended from each of the one or more divider rods of the tent compartment assembly being a curtain having an upper end which is slidably suspended from the divider rod using a plurality of curtain hooks and/or loops.

14. A trailer or truck comprising:

a cargo housing having (i) a cargo compartment therein, (ii) a cargo bed which extends longitudinally in a bottom of the cargo housing, (iii) a roof spaced above the cargo bed, (iv) a first substantially vertical side which extends longitudinally between a rearward longitudinal end and a forward longitudinal end of the cargo housing, and (v) a second substantially vertical side, opposite the first substantially vertical side, which extends longitudinally between the rearward longitudinal end and the forward longitudinal end;

at least the first substantially vertical side having a side opening therein, the side opening having a longitudinal length which is at least two thirds of a longitudinal distance measured from the rearward longitudinal end to the forward longitudinal end of the cargo housing;

a tent compartment assembly comprising a side panel having a lower end which is pivotably connected to the cargo housing for pivoting the side panel (i) from a raised position, in which the side panel covers the side opening, to at least (ii) a lowered position in which the side panel becomes a floor of the tent compartment assembly, a collapsible tent having (i) a bottom end which is attached the side panel and (ii) an inner side which is connected to the cargo housing along at least most of a longitudinal top, at least most of a substantially vertical forward end, and at least most of a substantially vertical rearward end of the side opening of the cargo housing so that the side opening of the cargo housing is an entryway for the tent compartment assembly when the side panel is in the lowered position, a tent wall frame which is pivotably attached to the side panel so that when the side panel is in the lowered position, the tent wall frame can be pivoted upwardly inside the collapsible tent to a raised position in which the tent wall frame raises and supports an outer wall of the collapsible tent, wherein when the outer wall of the collapsible tent is raised, it is opposite the inner side of the collapsible tent,

a tent roof frame which is pivotably attached to the tent
wall frame so that when the tent wall frame is
pivoted upwardly to the raised position of the tent
wall frame, the tent roof frame can be pivoted
upwardly inside the collapsible tent to a raised
position to raise and support a roof of the collapsible
tent, and
the side opening in the first substantially vertical side
extending upwardly from the cargo bed to the roof of
the cargo housing; and
a door in the first substantially vertical side of the cargo
housing which is (i) located forwardly of the substan-
tially vertical forward end of the side opening or (ii)
rearwardly of the substantially vertical rearward end of
the side opening.

15. A trailer or truck comprising:
a cargo housing having (i) a cargo compartment therein,
(ii) a cargo bed which extends longitudinally in a
bottom of the cargo housing, (iii) a roof spaced above
the cargo bed, (iv) a first substantially vertical side
which extends longitudinally between a rearward lon-
gitudinal end and a forward longitudinal end of the
cargo housing, and (v) a second substantially vertical
side, opposite the first substantially vertical side, which
extends longitudinally between the rearward longitu-
dinal end and the forward longitudinal end;
at least the first substantially vertical side having a side
opening therein, the side opening having a longitudinal
length which is at least half of a longitudinal distance
measured from the rearward longitudinal end to the
forward longitudinal end of the cargo housing; and
a tent compartment assembly comprising
a side panel having a lower end which is pivotably
connected to the cargo housing for pivoting the side
panel (i) from a raised position, in which the side
panel covers the side opening, to at least (ii) a
lowered position in which the side panel becomes a
floor of the tent compartment assembly,
a collapsible tent having (i) a bottom end which is
attached the side panel and (ii) an inner side which
is connected to the cargo housing along at least most
of a longitudinal top, at least most of a substantially
vertical forward end, and at least most of a substan-
tially vertical rearward end of the side opening of the
cargo housing so that the side opening of the cargo
housing is an entryway for the tent compartment
assembly when the side panel is in the lowered
position,
a tent wall frame which is pivotably attached to the side
panel so that when the side panel is in the lowered position, the tent wall frame can be pivoted upwardly
inside the collapsible tent to a raised position in
which the tent wall frame raises and supports an
outer wall of the collapsible tent, wherein when the
outer wall of the collapsible tent is raised, it is
opposite the inner side of the collapsible tent,
a tent roof frame which is pivotably attached to the tent
wall frame so that when the tent wall frame is
pivoted upwardly to the raised position of the tent
wall frame, the tent roof frame can be pivoted
upwardly inside the collapsible tent to a raised
position to raise and support a roof of the collapsible
tent, and
the tent wall frame further comprising (i) a distal,
longitudinally extending frame member which is
parallel to the side panel and (ii) a plurality of
connecting frame members which extend between
the side panel and the distal, longitudinally extend-
ing frame member.

16. The trailer or truck of claim 15 further comprising the
connecting frame members of the tent wall frame having
proximal ends which are pivotably connected to the side
panel and distal ends which are connected to the distal,
longitudinally extending frame member of the tent wall
frame.

17. The trailer or truck of claim 15 further comprising the
tent roof frame comprising:
a distal, longitudinally extending frame member which is
parallel to the distal, longitudinally extending frame
member of the tent wall frame and
a plurality of connecting frame members which extend
between the distal, longitudinally extending frame
member of the tent wall frame and the distal, longitu-
dinally extending frame member of the tent roof frame.

18. The trailer or truck of claim 17 further comprising one
or more tensioners which extend from the distal, longitudi-
nally extended frame member of the tent roof frame to an
underside of the roof of the cargo housing to tension the tent
roof frame toward or away from the roof of the cargo
housing.

19. The trailer or truck of claim 17 further comprising the
connecting frame members of the tent roof frame having
proximal ends which are pivotably connected to the distal,
longitudinally extending frame member of the tent wall
frame and distal ends which are connected to the distal,
longitudinally extending frame member of the tent roof
frame.

* * * * *